(12) United States Patent
Zhao

(10) Patent No.: US 11,580,863 B2
(45) Date of Patent: Feb. 14, 2023

(54) COMMUNICATIONS METHOD, APPARATUS, AND SYSTEM

(71) Applicant: Huawei Cloud Computing Technologies Co., Ltd., Guizhou (CN)

(72) Inventor: Can Zhao, Shenzhen (CN)

(73) Assignee: HUAWEI CLOUD COMPUTINGTECHNOLOGIES CO., LTD., Guizhou (CN)

( * ) Notice: Subject to any disclaimer, the term of this patent is extended or adjusted under 35 U.S.C. 154(b) by 216 days.

(21) Appl. No.: 16/913,578

(22) Filed: Jun. 26, 2020

(65) Prior Publication Data

US 2020/0342768 A1  Oct. 29, 2020

Related U.S. Application Data

(63) Continuation of application No. PCT/CN2018/123413, filed on Dec. 25, 2018.

(30) Foreign Application Priority Data

Dec. 29, 2017 (CN) .......................... 201711477980.4

(51) Int. Cl.
*G08G 1/00* (2006.01)
*H04W 4/50* (2018.01)
(Continued)

(52) U.S. Cl.
CPC .......... *G08G 1/22* (2013.01); *G08G 1/096791* (2013.01); *H04W 4/46* (2018.02); *H04W 4/50* (2018.02)

(58) Field of Classification Search
CPC ..... G08G 1/22; G08G 1/096791; H04W 4/46; H04W 4/50
(Continued)

(56) References Cited

U.S. PATENT DOCUMENTS

2007/0097906 A1  5/2007 Kato
2010/0248618 A1  9/2010 Bai et al.
(Continued)

FOREIGN PATENT DOCUMENTS

CN  101902700 A  12/2010
CN  102893694 A  1/2013
(Continued)

OTHER PUBLICATIONS

3GPP TR 22.886, V15.1.0, "3rd Generation Partnership Project; Technical Specification Group Services and System Aspects; Study on enhancement of 3GPP Support for 5G V2X Services (Release 15)," Mar. 2017, 58 pages.
(Continued)

*Primary Examiner* — Faisal Choudhury
(74) *Attorney, Agent, or Firm* — Conley Rose, P.C.

(57) ABSTRACT

A communications method includes determining, by a first platoon member, at least one second platoon member, where the first platoon member and the at least one second platoon member belong to a same platoon, and signal quality of a communication link from the first platoon member to each second platoon member is less than a first preset quality threshold, determining, by the first platoon member, a target communications node, where signal quality of a communication link from the target communications node to each second platoon member is greater than or equal to the first preset quality threshold, and sending, by the first platoon member, to-be-sent data to each second platoon member through the target communications node.

17 Claims, 13 Drawing Sheets

(51) Int. Cl.
*H04W 4/46* (2018.01)
*G08G 1/0967* (2006.01)

(58) Field of Classification Search
USPC .......................................................... 701/117
See application file for complete search history.

(56) References Cited

U.S. PATENT DOCUMENTS

| | | | |
|---|---|---|---|
| 2014/0005915 A1 | 1/2014 | Smith et al. | |
| 2017/0127249 A1 | 5/2017 | Li et al. | |
| 2018/0139682 A1* | 5/2018 | Xu | H04W 88/04 |
| 2018/0188745 A1* | 7/2018 | Pilkington | G05D 1/0295 |
| 2018/0343598 A1* | 11/2018 | Xu | H04W 36/08 |
| 2018/0376308 A1* | 12/2018 | Xiao | H04W 76/27 |

FOREIGN PATENT DOCUMENTS

| | | |
|---|---|---|
| CN | 103475580 A | 12/2013 |
| CN | 105898676 A | 8/2016 |
| CN | 104395173 B | 10/2016 |
| CN | 106485947 A | 3/2017 |
| CN | 106658351 A | 5/2017 |
| CN | 106900028 A * | 6/2017 |
| CN | 106900028 A | 6/2017 |
| EP | 2571328 B1 | 10/2016 |
| EP | 3373605 A1 | 9/2018 |
| JP | 2007129380 A | 5/2007 |
| JP | 2013167510 A | 8/2013 |
| WO | 2013179226 A1 | 12/2013 |
| WO | 2017027355 A1 | 2/2017 |
| WO | 2017209666 A1 | 12/2017 |

OTHER PUBLICATIONS

3GPP TS 22.186, V15 2.0, "3rd Generation Partnership Project; Technical Specification Group Services and System Aspects; Enhancement of 3GPP support for V2X scenarios; Stage 1 (Release 15)," Sep. 2017, 16 pages.

Meireles, R., et al.,"Experimental Study on the Impact of Vehicular Obstructions in VANETs," IEEE Vehicular Networking Conference, 2010, 8 pages.

ETSI TR 103 298 V0.0.1, "Intelligent Transport Systems (ITS); Platooning; Pre-standardization study," Jun. 2016, 10 pages.

Gallo, L., et al., "Resource Allocation for LTE-Direct Broadcast of Periodic Vehicular Safety Messages," Research Report RR-13-290, Feb. 26, 2014, 26 pages.

Opensignal, "The State of LTE (Nov. 2016), Report Report," Retrieved from : https://www.opensignal.com/reports/2016/11/state-of-lte, Nov. 2016, 14 pages.

Rehman, O., et al., "Relay Selection for Alert Messaging in VANETs based on Bi-Directional Stable Communication Approach," XP032687301, Fifth International Conference on Computing, Communications and Networking Technologies (ICCCNT), Jul. 11, 2014, 7 pages.

* cited by examiner

COMMUNICATIONS METHOD, APPARATUS, AND SYSTEM

CROSS-REFERENCE TO RELATED APPLICATIONS

This application is a continuation of International Patent Application No. PCT/CN2018/123413 filed on Dec. 25, 2018, which claims priority to Chinese Patent Application No. 201711477980.4 filed on Dec. 29, 2017. The disclosures of the aforementioned applications are hereby incorporated by reference in their entireties.

TECHNICAL FIELD

This application relates to the communications field, and in particular, to a communications method, apparatus, and system.

BACKGROUND

A platoon is an important application in the Internet of vehicles, and means that a plurality of vehicles equipped with intelligent sensing devices and short-range communications devices are lined up in a row, and a leading vehicle is controlled by a driver, and a following vehicle in the platoon is controlled through an Internet of vehicles communications technology, to follow a moving track of the leading vehicle such that the plurality of vehicles automatically travel.

Currently, in the Internet of vehicles, vehicles in the platoon communicate with each other in a direct device-to-device (D2D) communication mode. However, when communication between a vehicle in the platoon and another vehicle in the platoon is congested, or is blocked by objects, the vehicle cannot send a message or forward a group message of the platoon to the other vehicle. Consequently, a traffic accident is easily caused.

SUMMARY

To avoid blocking of communication between platoon members, embodiments of this application provide a communications method, apparatus, and system. The technical solutions are as follows.

According to a first aspect, this application provides a communications method. In the method, a first platoon member determines at least one second platoon member. The first platoon member and the at least one second platoon member belong to a same platoon, and signal quality of a communication link from the first platoon member to each second platoon member is less than a first preset quality threshold. The first platoon member determines a target communications node. Signal quality of a communication link from the target communications node to each second platoon member is greater than or equal to the first preset quality threshold. In this way, the first platoon member sends to-be-sent data to each second platoon member through the target communications node. Therefore, each second platoon member can receive the to-be-sent data of the first platoon member. This avoids blocking of communication between the first platoon member and the second platoon member.

In a possible implementation of the first aspect, a device identifier of the first platoon member is determined as a sending device identifier, and at least one corresponding receiving device identifier is obtained from a first communication quality table based on the sending device identifier. Signal quality of a communication link from a platoon member corresponding to a sending device identifier stored in each record in the first communication quality table to a platoon member corresponding to a receiving device identifier stored in the record is less than the first preset quality threshold. A platoon member corresponding to each of the at least one receiving device identifier is determined as the second platoon member. In this way, after the first platoon member sends data, the first platoon member can determine, through the first communication quality table, each second platoon member that cannot receive the data.

In a possible implementation of the first aspect, a device identifier of the first platoon member is determined as a sending device identifier, and at least one corresponding receiving device identifier is obtained from a second communication quality table based on the sending device identifier. Signal quality of a communication link from a platoon member corresponding to a sending device identifier stored in each record in the second communication quality table to a platoon member corresponding to a receiving device identifier stored in the record is greater than or equal to the first preset quality threshold. The device identifier of the first platoon member and the at least one receiving device identifier are removed from a first member list to obtain a second member list. A platoon member corresponding to each device identifier in the second member list is the second platoon member, and the first member list includes a device identifier of each platoon member in the platoon. In this way, after the first platoon member sends data, the first platoon member can determine, through the second communication quality table, each second platoon member that cannot receive the data.

In a possible implementation of the first aspect, a device identifier of each second platoon member is used as a receiving device identifier, and at least one corresponding sending device identifier is obtained from the first communication quality table based on the receiving device identifier. The signal quality of the communication link from the platoon member corresponding to the sending device identifier stored in each record in the first communication quality table to the platoon member corresponding to the receiving device identifier stored in the record is less than the first preset quality threshold. The at least one sending device identifier and the device identifier of each second platoon member are removed from the first member list to obtain a third member list. The first member list includes the device identifier of each platoon member in the platoon. One or more of platoon members corresponding to device identifiers in the third member list are selected as one or more target communications nodes. In this way, the first platoon member can determine, through the first communication quality table, the target communications node that can forward the data of the first platoon member to each second platoon member.

In a possible implementation of the first aspect, the device identifier of the first platoon member is used as the sending device identifier, and the at least one corresponding receiving device identifier is obtained from the second communication quality table based on the sending device identifier. The signal quality of the communication link from the platoon member corresponding to the sending device identifier stored in each record in the second communication quality table to the platoon member corresponding to the receiving device identifier stored in the record is greater than or equal to the first preset quality threshold. A device identifier of each second platoon member is used as a receiving device identifier, and at least one corresponding sending device identifier is obtained from the second communication quality table based on the receiving device identifier. An intersection set of a receiving member list and a sending member list is calculated to obtain a third member list. The receiving member list includes the at least one receiving device identifier, and the sending member list includes the at least one sending device identifier. One of platoon members corresponding to device identifiers in the third member list is selected as the target communications node. In this way, the first platoon member can determine, through the second communication quality table, the target communications node that can forward the data of the first platoon member to each second platoon member.

In a possible implementation of the first aspect, a device identifier of a platoon member whose load exceeds a first preset load threshold and/or a device identifier of a platoon member at the head of the platoon are/is removed from the third member list. In this way, when the target communications node is to be sent, a non-leading platoon member or a platoon member with a relatively light load may be preferentially selected as the target communications node. This ensures that the target communications node can successfully forward the to-be-sent data to the second platoon member.

In a possible implementation of the first aspect, when the third member list is empty, an application server in the Internet of vehicles is determined as the target communications node. In this way, the to-be-sent data can be forwarded to the second platoon member through the application server. This avoids blocking of communication between the first platoon member and the second platoon member.

In a possible implementation of the first aspect, when the target communications node is a platoon member in the platoon, a first Internet of vehicles message is broadcast to all platoon members included in the platoon, where the first Internet of vehicles message includes the to-be-sent data and a device identifier of the target communications node, and the first Internet of vehicles message is used by the target communications node to broadcast a second Internet of vehicles message including the to-be-sent data to other platoon members included in the platoon, or when the target communications node is a platoon member in the platoon, a first Internet of vehicles message is broadcast to all platoon members included in the platoon, where the first Internet of vehicles message includes the to-be-sent data, a device identifier of the target communications node, and the device identifier of each second platoon member, and the first Internet of vehicles message is used by the target communications node to send the to-be-sent data to each second platoon member based on the device identifier of each second platoon member. In this way, the first platoon member sends the to-be-sent data to each second platoon member through the target communications node. This avoids blocking of communication between the first platoon member and the second platoon member.

In a possible implementation of the first aspect, when the target communications node is the application server in the Internet of vehicles, a forwarding message is sent to the application server. The forwarding message includes the to-be-sent data and identification information used to identify the at least one second platoon member, and the identification information is used by the application server to send the to-be-sent data to each second platoon member. In this way, the first platoon member sends the to-be-sent data to each second platoon member through the application server. This avoids blocking of communication between the first platoon member and the second platoon member.

In a possible implementation of the first aspect, when other platoon members in the platoon that are different from the first platoon member are all second platoon members, the identification information is a group identifier of the platoon, or when not all other platoon members in the platoon that are different from the first platoon member are second platoon members, the identification information is the device identifier of each second platoon member.

In a possible implementation of the first aspect, it is detected that signal quality of a communication link from a third platoon member to a fourth platoon member is less than the first preset quality threshold. A device identifier of the third platoon member is used as a sending device identifier and a device identifier of the fourth platoon member is used as a receiving device identifier. The sending device identifier and the receiving device identifier are correspondingly stored in the first communication quality table. The third platoon member and the fourth platoon member are two platoon members in the platoon. Therefore, the first communication quality table can be updated in real time, to ensure that the second platoon member and the target communications node are accurately determined through the first communication quality table.

In a possible implementation of the first aspect, a reference signal sent by the third platoon member is received. When signal quality of the reference signal is less than the first preset quality threshold, the first platoon member is used as the fourth platoon member, and it is detected that the signal quality of the communication link from the third platoon member to the fourth platoon member is less than the first preset quality threshold. Alternatively, a third Internet of vehicles message is received, and the third Internet of vehicles message is broadcast by the fourth platoon member when it is detected that the signal quality of the communication link from the third platoon member to the fourth platoon member is less than the first preset quality threshold. The third Internet of vehicles message includes the device identifier of the third platoon member and the device identifier of the fourth platoon member. In this way, it is detected, through the reference signal, whether the signal quality of the communication link from the third platoon member to the fourth platoon member is less than the first preset quality threshold.

In a possible implementation of the first aspect, it is detected that the signal quality of the communication link from the third platoon member to the fourth platoon member is greater than or equal to a second preset quality threshold. The device identifier of the third platoon member is used as the sending device identifier and the device identifier of the fourth platoon member is used as the receiving device identifier. A record including the sending device identifier and the receiving device identifier is deleted from the first communication quality table. The second preset quality threshold is greater than or equal to the first preset quality threshold. Therefore, the first communication quality table can be updated in real time, to ensure that the second platoon member and the target communications node are accurately determined through the first communication quality table.

In a possible implementation of the first aspect, a reference signal sent by the third platoon member is received. When signal quality of the reference signal is greater than or equal to the second preset quality threshold, the first platoon member is used as the fourth platoon member, and it is detected that the signal quality of the communication link from the third platoon member to the fourth platoon member is greater than or equal to the second preset quality threshold. Alternatively, a fourth Internet of vehicles message is received, and the fourth Internet of vehicles message is broadcast by the fourth platoon member when it is detected that the signal quality of the communication link from the third platoon member to the fourth platoon member is greater than or equal to the second preset quality threshold. The fourth Internet of vehicles message includes the device identifier of the third platoon member and the device identifier of the fourth platoon member. In this way, it is detected, through the reference signal, whether the signal quality of the communication link from the third platoon member to the fourth platoon member is greater than or equal to the second preset quality threshold.

In a possible implementation of the first aspect, when the first communication quality table changes, records in the first communication quality table are removed from a global communication quality table to obtain the second communication quality table. A sending device identifier stored in each record in the global communication quality table corresponds to a platoon member in the platoon, and a receiving device identifier stored in the record corresponds to another platoon member in the platoon.

In a possible implementation of the first aspect, it is detected that signal quality of a communication link from a third platoon member to a fourth platoon member is greater than or equal to a second preset quality threshold. A device identifier of the third platoon member is used as a sending device identifier and a device identifier of the fourth platoon member is used as a receiving device identifier. The sending device identifier and the receiving device identifier are correspondingly stored in the second communication quality table. The third platoon member and the fourth platoon member are two platoon members in the platoon, and the second preset quality threshold is greater than or equal to the first preset quality threshold. Therefore, the second communication quality table can be updated in real time, to ensure that the second platoon member and the target communications node are accurately determined through the second communication quality table.

In a possible implementation of the first aspect, a reference signal sent by the third platoon member is received. When signal quality of the reference signal is greater than or equal to the second preset quality threshold, the first platoon member is used as the fourth platoon member, and it is detected that the signal quality of the communication link from the third platoon member to the fourth platoon member is greater than or equal to the second preset quality threshold. Alternatively, a third Internet of vehicles message is received, and the third Internet of vehicles message is broadcast by the fourth platoon member when it is detected that the signal quality of the communication link from the third platoon member to the fourth platoon member is greater than or equal to the second preset quality threshold. The third Internet of vehicles message includes the device identifier of the third platoon member and the device identifier of the fourth platoon member. In this way, it is detected, through the reference signal, whether the signal quality of the communication link from the third platoon member to the fourth platoon member is greater than or equal to the second preset quality threshold.

In a possible implementation of the first aspect, it is detected that the signal quality of the communication link from the third platoon member to the fourth platoon member is less than the first preset quality threshold. The device identifier of the third platoon member is used as the sending device identifier and the device identifier of the fourth platoon member is used as the receiving device identifier. A record including the sending device identifier and the receiving device identifier is deleted from the second communication quality table. Therefore, the second communication quality table can be updated in real time, to ensure that the second platoon member and the target communications node are accurately determined through the second communication quality table.

In a possible implementation of the first aspect, a reference signal sent by the third platoon member is received. When signal quality of the reference signal is less than the first preset quality threshold, the first platoon member is used as the fourth platoon member, and it is detected that the signal quality of the communication link from the third platoon member to the fourth platoon member is less than the first preset quality threshold. Alternatively, a fourth Internet of vehicles message is received, and the fourth Internet of vehicles message is broadcast by the fourth platoon member when it is detected that the signal quality of the communication link from the third platoon member to the fourth platoon member is less than the first preset quality threshold. The fourth Internet of vehicles message includes the device identifier of the third platoon member and the device identifier of the fourth platoon member. In this way, it is detected, through the reference signal, whether the signal quality of the communication link from the third platoon member to the fourth platoon member is less than the first preset quality threshold.

In a possible implementation of the first aspect, when it is detected that a load of a platoon member in the platoon exceeds the first preset load threshold, a device identifier of the platoon member is added to an overload list. Therefore, the overload list can be updated in real time. In this way, when the target communications node is to be sent, a platoon member with an excessively heavy load is prevented from being selected as the target communications node, and data forwarding is prevented from being affected.

In a possible implementation of the first aspect, when it is detected that a load of the first platoon member exceeds the first preset load threshold, the device identifier of the first platoon member is added to the overload list, and/or a fifth Internet of vehicles message is received, and the fifth Internet of vehicles message is broadcast by a fifth platoon member when a load of the fifth platoon member exceeds the first preset load threshold. The fifth Internet of vehicles message includes a device identifier of the fifth platoon member, and the fifth platoon member is another platoon member in the platoon that is different from the first platoon member. The device identifier of the fifth platoon member is added to the overload list. Therefore, the overload list can be updated.

In a possible implementation of the first aspect, when it is detected that a load of the platoon member is less than the second preset load threshold, a device identifier of the platoon member is removed from the overload list. The second preset load threshold is less than or equal to the first preset load threshold. Therefore, the overload list can be updated in real time. In this way, when the target communications node is to be selected, a platoon member with an excessively heavy load is accurately removed.

In a possible implementation of the first aspect, when it is detected that the load of the first platoon member is less than the second preset load threshold, the device identifier of the first platoon member is removed from the overload list, and/or a sixth Internet of vehicles message is received, and the sixth Internet of vehicles message is broadcast by the fifth platoon member when the load of the fifth platoon member is less than the second preset load threshold. The sixth Internet of vehicles message includes the device identifier of the fifth platoon member, and the fifth platoon member is another platoon member in the platoon that is different from the first platoon member. The device identifier of the fifth platoon member is removed from the overload list. Therefore, the overload list can be updated.

In a possible implementation of the first aspect, when the first platoon member joins the platoon, a first group message of the platoon that is sent by the platoon member at the head of the platoon is received. The first group message includes at least one of the first member list, the first communication quality table, the second communication quality table, the first preset quality threshold, the second preset quality threshold, the first preset load threshold, and the second preset load threshold. The first member list includes the device identifier of each platoon member in the platoon. The signal quality of the communication link from the platoon member corresponding to the sending device identifier stored in each record in the first communication quality table to the platoon member corresponding to the receiving device identifier stored in the record is less than the first preset quality threshold. The signal quality of the communication link from the platoon member corresponding to the sending device identifier stored in each record in the second communication quality table to the platoon member corresponding to the receiving device identifier stored in the record is greater than or equal to the first preset quality threshold.

In a possible implementation of the first aspect, when a platoon member joins the platoon, a device identifier of the joined platoon member is added to the first member list, and/or when a platoon member exits from the platoon, a device identifier of the platoon member that exits is removed from the first member list. The first member list includes the device identifier of each platoon member in the platoon.

In a possible implementation of the first aspect, when the first member list changes, a changed first member list is updated to another platoon member in the platoon that is different from the first platoon member, and/or the changed first member list is updated to the application server in the Internet of vehicles.

In a possible implementation of the first aspect, at least one of the first preset quality threshold, the second preset quality threshold, the first preset load threshold, and the second preset load threshold is received, and the thresholds are sent by the application server in the Internet of vehicles or an Internet of vehicles control functional entity. In this way, the thresholds can be used to trigger a platoon member in the platoon to detect communication quality.

According to a second aspect, this application provides a communications method. In the method, a platoon member receives a first Internet of vehicles message that is broadcast by a first platoon member. The first Internet of vehicles message includes to-be-sent data of the first platoon member and a device identifier of a target communications node, signal quality of a communication link from the target communications node to each of at least one second platoon member is greater than or equal to a first preset quality threshold, signal quality of a communication link from the first platoon member to each second platoon member is less than the first preset quality threshold, and the first platoon member, each second platoon member, and the platoon member belong to a same platoon. When a device identifier of the platoon member is the same as the device identifier of the target communications node, the platoon member sends the to-be-sent data to each second platoon member. Therefore, each second platoon member can receive the to-be-sent data of the first platoon member. This avoids blocking of communication between the first platoon member and the second platoon member.

In a possible implementation of the first aspect, when the first Internet of vehicles message further includes a device identifier of each second platoon member, the to-be-sent data is sent to each second platoon member based on the device identifier of each second platoon member, or when the first Internet of vehicles message does not include the device identifier of each second platoon member, the to-be-sent data is broadcast to other platoon members in the platoon. In this way, the to-be-sent data is forwarded to the second platoon member.

According to a third aspect, this application provides a communications method. In the method, an application server receives a forwarding message sent by a first platoon member. The forwarding message includes to-be-sent data and identification information used to identify at least one second platoon member, signal quality of a communication link from the first platoon member to each of the at least one second platoon member is less than a first preset quality threshold, and the first platoon member and each second platoon member belong to a same platoon. The application server sends the to-be-sent data to each second platoon member based on the identification information. Therefore, each second platoon member can receive the to-be-sent data of the first platoon member. This avoids blocking of communication between the first platoon member and the second platoon member.

In a possible implementation of the third aspect, a second group message sent by a platoon member at the head of the platoon when the platoon is established is received. The second group message includes a group identifier of the platoon and a first member list, and the first member list includes a device identifier of each platoon member in the platoon.

In a possible implementation of the third aspect, when the identification information is the group identifier of the platoon, the to-be-sent data is sent to each second platoon member based on the first member list corresponding to the group identifier.

Alternatively, when the identification information is a device identifier of each second platoon member, the to-be-sent data is sent to each second platoon member based on the device identifier of each second platoon member. In this way, the to-be-sent data is forwarded to the second platoon member.

According to a fourth aspect, this application provides a communications apparatus configured to perform the method according to any one of the first aspect or the possible implementations of the first aspect, or the method according to any one of the second aspect or the possible implementations of the second aspect. Further, the apparatus includes a module configured to perform the method according to any one of the first aspect or the possible implementations of the first aspect, or the method according to any one of the second aspect or the possible implementations of the second aspect.

According to a fifth aspect, this application provides a communications apparatus configured to perform the method according to the third aspect or any possible implementation of the third aspect. Further, the apparatus includes a module configured to perform the method according to the third aspect or any possible implementation of the third aspect.

According to a sixth aspect, this application provides a communications apparatus, and the apparatus includes an input interface, an output interface, a processor, and a memory. The input interface, the output interface, the processor, and the memory may be connected through a bus system. The memory is configured to store a program, an instruction, or code. The processor is configured to execute the program, the instruction, or the code in the memory, to complete the method according to any one of the first aspect or the possible implementations of the first aspect, or the method according to any one of the second aspect or the possible implementations of the second aspect.

According to a seventh aspect, this application provides a communications apparatus, and the apparatus includes an input interface, an output interface, a processor, and a memory. The input interface, the output interface, the processor, and the memory may be connected through a bus system. The memory is configured to store a program, an instruction, or code. The processor is configured to execute the program, the instruction, or the code in the memory, to complete the method according to the third aspect or any possible implementation of the third aspect.

According to an eighth aspect, an embodiment of this application provides a computer program product. The computer program product includes a computer program stored in a computer readable storage medium. In addition, the computing program is loaded through a processor, to implement the method according to any one of the first aspect or the possible implementations of the first aspect, the method according to any one of the second aspect or the possible implementations of the second aspect, or the method according to any one of the third aspect or possible implementations of the third aspect.

According to a ninth aspect, an embodiment of this application provides a computer readable storage medium configured to store a computer program. The computer program is loaded through a processor, to execute an instruction in the method according to any one of the first aspect or the possible implementations of the first aspect, the method according to any one of the second aspect or the possible implementations of the second aspect, or the method according to any one of the third aspect or possible implementations of the third aspect.

According to a tenth aspect, an embodiment of this application provides a chip, and the chip includes a programmable logic circuit and/or a program instruction. When the chip runs, the chip is configured to implement the method according to any one of the first aspect or the possible implementations of the first aspect, the method according to any one of the second aspect or the possible implementations of the second aspect, or the method according to any one of the third aspect or possible implementations of the third aspect.

According to an eleventh aspect, an embodiment of this application provides a communications system, and the system includes the apparatus according to the fourth aspect or the sixth aspect and the apparatus according to the fifth aspect or the seventh aspect.

DESCRIPTION OF EMBODIMENTS

The following further describes in detail the embodiments of this application with reference to accompanying drawings.

Figure 1A:
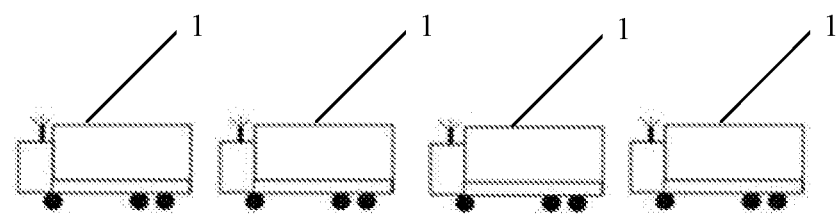
FIG. 1A is a schematic diagram of a platoon according to an embodiment of this application.

Referring to FIG. 1A, a network architecture provided in the embodiments of this application includes a plurality of platoon members 1.

The plurality of platoon members 1 may constitute one platoon. The platoon member 1 herein may be each vehicle in the platoon, and may be specifically a communications device installed on each vehicle.

The platoon member 1 may communicate with another platoon member directly, for example, in a PC5 communication mode or through any other future possible direct communications technology. This is not limited in this application.

In addition to the platoon, the platoon member 1 may further communicate with another device or apparatus in a network, for example, in a Uu communication mode. The Uu communication mode is a mode in which a platoon member communicates with an access network device in a telecommunication network. Alternatively, the platoon member 1 may communicate with the other device or apparatus through another future possible communications technology. This is not limited in this application.

Figure 1B:
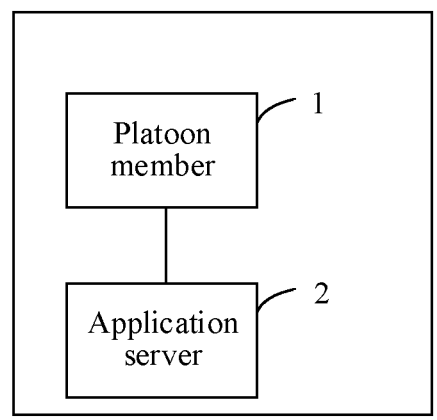
FIG. 1B is a schematic diagram of a network architecture according to an embodiment of this application.

Referring to FIG. 1B, the network architecture may further include an application server 2 located in the Internet of vehicles. The platoon member 1 in the platoon may send uplink data to the application server 2 in any communication mode. The application server 2 may send downlink data in a unicast mode to the platoon member 1 in the platoon, or may broadcast the downlink data to some or all of the platoon members 1 in the platoon.

Figure 1C:
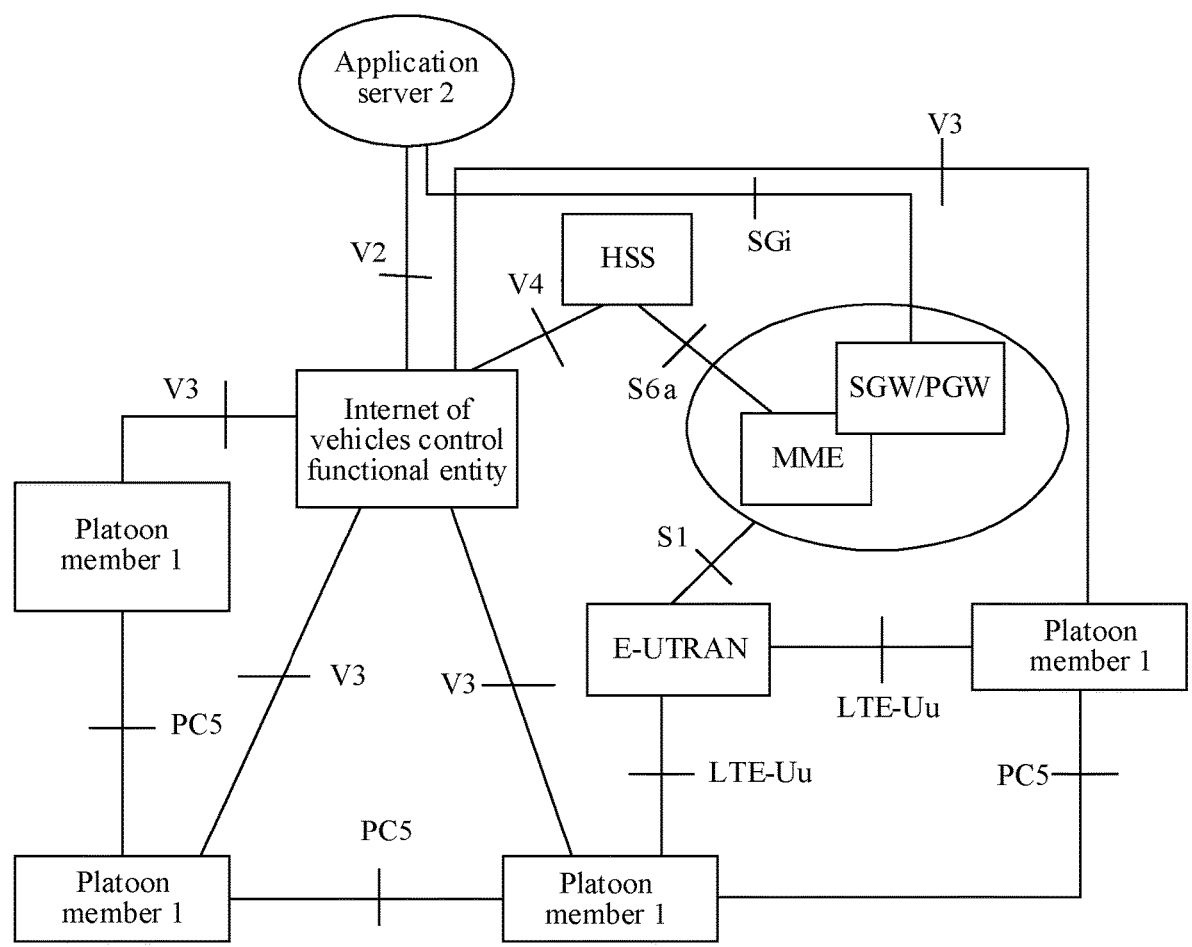
FIG. 1C is a schematic diagram of an example of a network architecture according to an embodiment of this application.
Figure 1D:
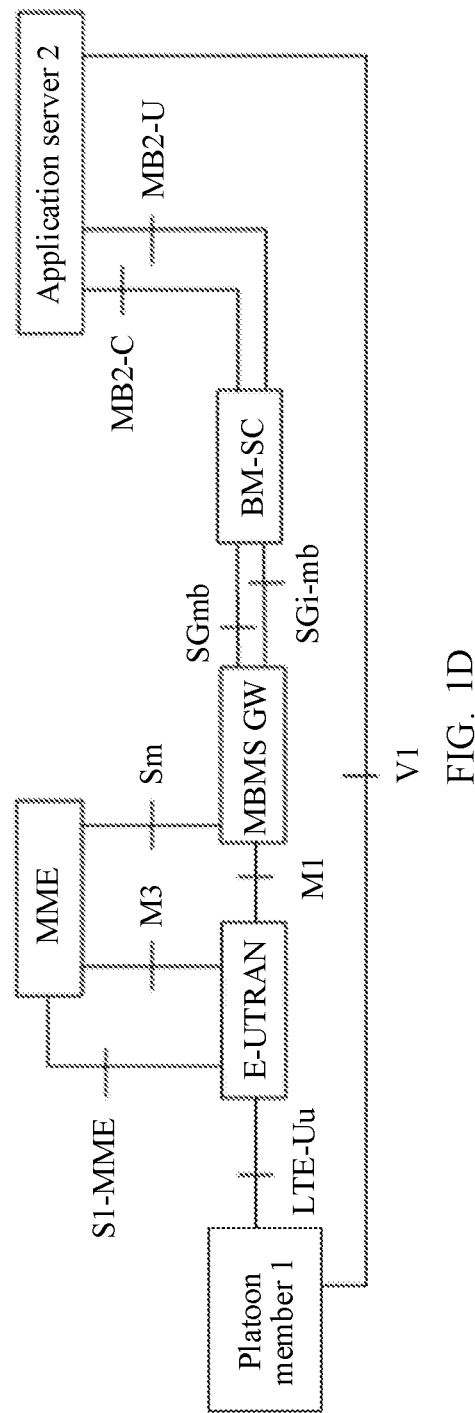
FIG. 1D is a schematic diagram of another example of a network architecture according to an embodiment of this application.

FIG. 1C shows a possible specific form of the network architecture shown in FIG. 1B. The application server 2 may send the downlink data in the unicast mode to the platoon member 1 in the platoon through an SGi interface. FIG. 1D shows another possible specific form of the network architecture shown in FIG. 1B. The application server 2 may broadcast the downlink data to some or all of the platoon members 1 in the platoon through an MB2-U interface. A person skilled in the art should understand that the communication and connection mode used between the platoon member 1 and the application server 2 are not limited to being applied to the network architectures shown in FIG. 1C and FIG. 1D.

Optionally, referring to FIG. 1C and FIG. 1D, the network architecture may further include a network element configured to establish a bearer between the platoon member 1 and the application server 2, and a network element through which the bearer between the platoon member 1 and the application server 2 passes. For example, these network elements may include a (S-GW), a public data network gateway (PGW), a (MME), a Home Subscriber Server (HSS), a Broadcast/Multicast Service Centre (MB-SC), a Multimedia Broadcast Multicast Service gateway (MBMS GW), and a 3rd generation mobile communication. In FIG. 1C and FIG. 1D, V1, V2, V3, V4, S1, S6a, LTE-Uu, M1, M3, Sm, SGmb, SGi-mb, MB2-C, and MB2-U are interface names.

An embodiment of this application provides a method for joining a platoon. The method may be applied to the network architecture provided in any one of the embodiments shown in FIG. 1A to FIG. 1D.

Figure 2:
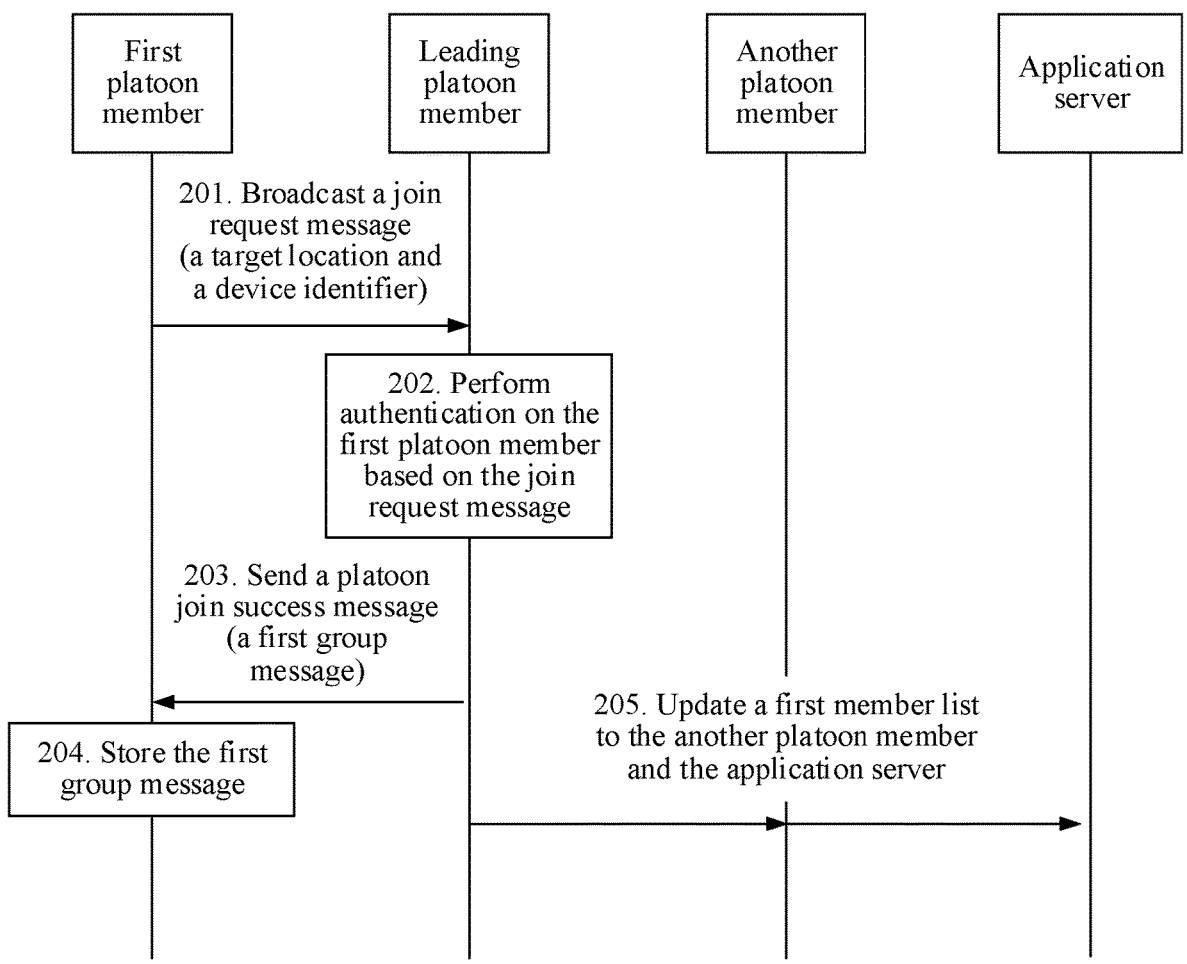
FIG. 2 is a flowchart of a method for joining a platoon according to an embodiment of this application.

For a platoon member at the head of a platoon, for ease of description, the platoon member is referred to as a leading platoon member. The leading platoon member may establish the platoon, and another platoon member in the platoon may request to join the platoon to the leading platoon member. For ease of description, a platoon member that requests to join the platoon is referred to as a first platoon member. Referring to FIG. 2, the method for joining a platoon includes the following steps.

Step 201. The first platoon member broadcasts a join request message, where the join request message carries a target location at which the first platoon member needs to arrive and a device identifier of the first platoon member.

The join request message may further include information such as a vehicle model of the first platoon member. The device identifier of the first platoon member may be an address of the first platoon member, or the like. For example, the device identifier of the first platoon member may be either of or a combination of an Internet Protocol (IP) address and a media access control (MAC) address of the first platoon member.

The first platoon member may broadcast the join request message to a surrounding device of the first platoon member in a PC5 communication mode. For a surrounding leading platoon member, in any platoon, of the first platoon member, the leading platoon member performs the following operations after receiving the join request message.

Step 202. The leading platoon member receives the join request message that is broadcast by the first platoon member, and performs authentication on the first platoon member based on the join request message.

The leading platoon member stores a target location at which the leading platoon member needs to arrive, and may further store a join condition of allowing joining the platoon. For example, the join condition may be allowing a platoon member of a preset vehicle model to join the platoon.

This step may be, the leading platoon member determines, based on a current location and the target location stored by the leading platoon member, a first path for arriving at the target location, and determines, based on the current location and the target location of the first platoon member that is carried in the join request message, a second path for arriving at the target location of the first platoon member. If the first path and the second path overlap, it may be determined that the first platoon member is authenticated, or if the first path and the second path do not overlap, it may be determined that the first platoon member fails to be authenticated.

If the first path and the second path overlap, and the leading platoon member further stores the join condition of allowing joining the platoon, before it is determined whether the first platoon member is authenticated, it may be further determined whether the first platoon member meets the join condition. If the first platoon member meets the join condition, it may be determined that the first platoon member is authenticated, or if the first platoon member does not meet the join condition, it may be determined that the first platoon member fails to be authenticated.

An example in which the join condition is "allowing a platoon member of a preset vehicle model to join the platoon" is used for description. When it is determined that the first path and the second path overlap, the leading platoon member determines whether the vehicle model of the first platoon member that is carried in the join request message is the preset vehicle model. If the vehicle model of the first platoon member is the preset vehicle model, it may be determined that the first platoon member is authenticated, or if the vehicle model of the first platoon member is not the preset vehicle model, it may be determined that the first platoon member fails to be authenticated.

Step 203. If the first platoon member is authenticated, the leading platoon member sends a platoon join success message to the first platoon member, where the platoon join success message includes a first group message of the platoon, and the platoon is the platoon to which the leading platoon member belongs.

When the first platoon member is authenticated, the leading platoon member adds the device identifier of the first platoon member to a first member list. The first member list includes a device identifier of each platoon member in the platoon. Then, the leading platoon member sends the platoon join success message including the first group message to the first platoon member.

The first group message includes at least one of messages such as the first member list, a first communication quality table, a second communication quality table, a first preset quality threshold, a second preset quality threshold, a first preset load threshold, and a second preset load threshold.

The first preset quality threshold is less than or equal to the second preset quality threshold, and the first preset load threshold is greater than or equal to the second preset load threshold.

Each record in the first communication quality table stores a sending device identifier and a receiving device identifier. The sending device identifier and the receiving device identifier stored in the record are used to indicate that signal quality of a communication link from a platoon member corresponding to the sending device identifier to a platoon member corresponding to the receiving device identifier is less than the first preset quality threshold.

Each record in the second communication quality table stores a sending device identifier and a receiving device identifier. The sending device identifier and the receiving device identifier stored in the record are used to indicate that signal quality of a communication link from a platoon member corresponding to the sending device identifier to a platoon member corresponding to the receiving device identifier is greater than or equal to the first preset quality threshold.

It should be noted that, in a traveling process of each platoon member in the platoon, signal quality of a communication link from a platoon member in the platoon to at least one another platoon member in the platoon may become poor due to reasons such as obstacle blocking. When the signal quality of the communication link is less than the first preset quality threshold, a device identifier of the platoon member may be used as a sending device identifier, and a device identifier of the other platoon member may be used as a receiving device identifier. The sending device identifier and the receiving device identifier are correspondingly stored as one record in the first communication quality table.

It should be further noted that, for each platoon member in the platoon, signal quality of a communication link from the platoon member to another platoon member in the platoon is relatively good. When the signal quality of the communication link is greater than or equal to the first preset quality threshold, a device identifier of the platoon member may be used as a sending device identifier, and a device identifier of the other platoon member may be used as a receiving device identifier. The sending device identifier and the receiving device identifier are correspondingly stored as one record in the second communication quality table.

Optionally, for at least one threshold of the first preset quality threshold, the second preset quality threshold, the first preset load threshold, and the second preset load threshold, the leading platoon member may obtain the at least one threshold from an application server when requesting the application server to authorize a service, or may obtain the at least one threshold when subscribing to a service in an Internet of vehicles control functional entity, or may obtain the at least one threshold from the application server when or after establishing the platoon, or may generate the at least one threshold.

Optionally, when requesting the application server to authorize a service, the leading platoon member sends an authorization request message to the application server. After receiving the authorization request message, the application server authorizes the leading platoon member, and may further send the at least one threshold of the first preset quality threshold, the second preset quality threshold, the first preset load threshold, and the second preset load threshold to the leading platoon member. Correspondingly, the leading platoon member receives the at least one threshold.

Optionally, when subscribing to a service in the Internet of vehicles control functional entity, the leading platoon member sends a subscription request message to the Internet of vehicles control functional entity. After receiving the subscription request message, the Internet of vehicles control functional entity subscribes to the leading platoon member, and may further send the at least one threshold of the first preset quality threshold, the second preset quality threshold, the first preset load threshold, and the second preset load threshold to the leading platoon member. Correspondingly, the leading platoon member receives the at least one threshold.

When establishing the platoon, the leading platoon member may register a group identifier of the platoon and the first member list in the application server, and may receive the first preset quality threshold, the second preset quality threshold, the first preset load threshold, and the second preset load threshold that are sent by the application server. A detailed implementation process is as follows.

Before this step is performed, the leading platoon member correspondingly stores the group identifier of the platoon and the first member list in the application server in the Internet of vehicles when establishing the platoon. An implementation process may be as follows.

(1) When establishing the platoon, the leading platoon member may establish the group identifier for the platoon. For example, the leading platoon member may use a device identifier of the leading platoon member and a current establishment time to constitute the group identifier of the platoon. For another example, the leading platoon member may use a device identifier of the leading platoon member, the target location at which the leading platoon member needs to arrive, and a current establishment time to constitute the group identifier of the platoon. Other implementations are not illustrated one by one.

(2) The leading platoon member sends a second group message of the platoon to the application server in the Internet of vehicles. The second group message may include the group identifier of the platoon and the first member list. In this case, the first member list includes the device identifier of each platoon member in the platoon when the platoon is established, and the first member list includes at least the device identifier of the leading platoon member.

(3) The application server receives the second group message, and may correspondingly store the group identifier and the first member list that are included in the second group message in a correspondence between the group identifier and the first member list.

After receiving the second group message, the application server may further perform the following operations.

(4) The application server sends the first preset quality threshold, the second preset quality threshold, the first preset load threshold, and the second preset load threshold to the leading platoon member.

(5) The leading platoon member receives and stores the first preset quality threshold, the second preset quality threshold, the first preset load threshold, and the second preset load threshold.

Alternatively, another platoon member in the platoon may obtain the at least one threshold from the application server when requesting the application server to authorize a service, or may obtain the at least one threshold when subscribing to a service in the Internet of vehicles control functional entity.

In other words, when requesting the application server to authorize a service, the other platoon member sends an authorization request message to the application server. After receiving the authorization request message, the application server authorizes the other platoon member, and may further send the at least one threshold of the first preset quality threshold, the second preset quality threshold, the first preset load threshold, and the second preset load threshold to the other platoon member. Correspondingly, the other platoon member receives the at least one threshold.

Alternatively/Additionally, when subscribing to a service in the Internet of vehicles control functional entity, the other platoon member sends a subscription request message to the Internet of vehicles control functional entity. After receiving the subscription request message, the Internet of vehicles control functional entity subscribes to the other platoon member, and may further send the at least one threshold of the first preset quality threshold, the second preset quality threshold, the first preset load threshold, and the second preset load threshold to the other platoon member. Correspondingly, the other platoon member receives the at least one threshold.

Step 204. The first platoon member receives the platoon join success message, and stores the first group message included in the platoon join success message.

In other words, the first platoon member stores the messages such as the first member list, the first communication quality table, the second communication quality table, the first preset quality threshold, the second preset quality threshold, the first preset load threshold, and/or the second preset load threshold that are included in the first group message.

Optionally, the first platoon member may establish a global communication quality table based on the first member list. Each record in the global communication quality table stores a sending device identifier and a receiving device identifier. A platoon member corresponding to the sending device identifier is a platoon member in the platoon, and a platoon member corresponding to the receiving device identifier is another platoon member in the platoon.

For example, the first member list includes a device identifier IDA of a platoon member A, a device identifier IDB of a platoon member B, a device identifier IDC of a platoon member C, a device identifier IDD of a platoon member D, and a device identifier IDE of a platoon member E. The first platoon member establishes a global communication quality table shown in Table 1 based on the first member list. The global communication quality table includes 20 records.

TABLE 1

| Sending device identifier | Receiving device identifier |
| --- | --- |
| IDA | IDB |
| IDA | IDC |
| IDA | IDD |
| IDA | IDE |
| IDB | IDA |
| IDB | IDC |
| IDB | IDD |
| IDB | IDE |
| IDC | IDA |
| IDC | IDB |
| IDC | IDD |
| IDC | IDE |
| IDD | IDA |
| IDD | IDB |
| IDD | IDC |
| IDD | IDE |
| IDE | IDA |
| IDE | IDB |
| IDE | IDC |
| IDE | IDD |

Optionally, the first group message may include the first communication quality table instead of the second communication quality table. In this way, the first platoon member may remove records included in the first communication quality table from the global communication quality table, to obtain the second communication quality table. For example, the first group message may include a first communication quality table shown in Table 2. The first communication quality table includes three records. The first platoon member may remove the three records included in the first communication quality table from the global communication quality table shown in Table 1, to obtain a second communication quality table shown in Table 3. The second communication quality table includes 17 records. In this way, an amount of data in the first group message can be reduced, and network resources can be less occupied.

TABLE 2

| Sending device identifier | Receiving device identifier |
| --- | --- |
| IDA | IDB |
| IDA | IDC |
| IDB | IDE |

TABLE 3

| Sending device identifier | Receiving device identifier |
| --- | --- |
| IDA | IDD |
| IDA | IDE |
| IDB | IDA |
| IDB | IDC |
| IDB | IDD |
| IDC | IDA |
| IDC | IDB |
| IDC | IDD |
| IDC | IDE |
| IDD | IDA |
| IDD | IDB |
| IDD | IDC |
| IDD | IDE |
| IDE | IDA |
| IDE | IDB |
| IDE | IDC |
| IDE | IDD |

Alternatively, the first group message may include the second communication quality table instead of the first communication quality table. In this way, the first platoon member may remove records included in the second communication quality table from the global communication quality table, to obtain the first communication quality table. For example, the first group message may include the second communication quality table shown in Table 3. The first platoon member may remove the records included in the second communication quality table from the global communication quality table shown in Table 1, to obtain the first communication quality table shown in Table 2. Therefore, an amount of data in the first group message can be reduced, and network resources can be less occupied.

Step 205. The leading platoon member updates the first member list to another platoon member in the platoon, and updates the first member list to the application server in the Internet of vehicles.

Optionally, the operation of updating the first member list to another platoon member in the platoon may be as follows.

First, the leading platoon member may broadcast a first group update message to the other platoon member in the platoon. The first group update message includes the first member list and/or the device identifier of the first platoon member.

Optionally, in an implementation, the leading platoon member separately broadcasts the first group update message to other platoon members in the first member list that are different from the first platoon member and the leading platoon member based on device identifiers of the other platoon members.

Then, for each of the other platoon members, the platoon member receives the first group update message. If the first group update message includes the first member list, a first member list stored by the platoon member is updated to the first member list included in the first group update message. If the first group update message includes the device identifier of the first platoon member, the device identifier of the first platoon member is added to the first member list stored by the platoon member.

Optionally, the operation of updating the first member list to the application server in this step may be as follows.

The leading platoon member may send a second group update message to the application server. The second group update message includes the group identifier of the platoon and the first member list, or the second group update message includes the group identifier of the platoon and the device identifier of the first platoon member. In this case, the first member list includes the device identifier of the first platoon member.

The application server receives the second group update message. If the second group update message includes the group identifier and the first member list, the first member list that corresponds to the group identifier and that is stored by the application server is updated to the first member list included in the second group update message. If the second group update message includes the group identifier and the device identifier of the first platoon member, the device identifier of the first platoon member is added to a first member list that corresponds to the group identifier and that is stored by the application server.

In this embodiment of this application, after the first platoon member joins the platoon, the leading platoon member sends thresholds such as the first member list, the first communication quality table, the second communication quality table, the first preset quality threshold, the second preset quality threshold, the first preset load threshold, and/or the second preset load threshold to the first platoon member, and updates the first member list to the other platoon member and the application server. In this way, a group message of the platoon may be updated to each platoon member in the platoon, and the first member list may be updated to the application server. A threshold in the group message may be used to trigger a platoon member in the platoon to detect communication quality.

An embodiment of this application provides a method for exiting from a platoon. The method may be applied to the network architecture provided in any one of the embodiments shown in FIG. 1A to FIG. 1D.

Figure 3:
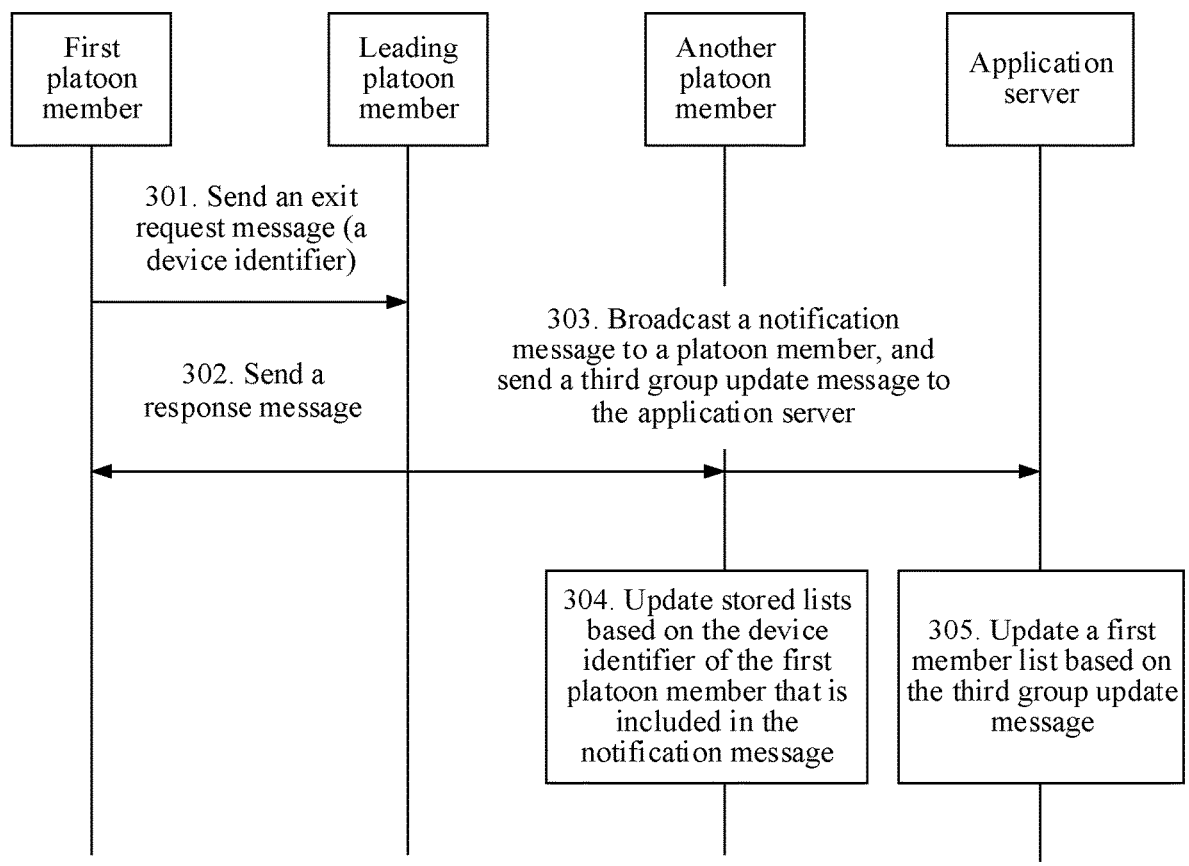
FIG. 3 is a flowchart of a method for exiting from a platoon according to an embodiment of this application.

After platoon members in the platoon join a platoon through the method shown in FIG. 2, another platoon member in the platoon that is different from a leading platoon member may exit from the platoon in a subsequent travelling process. For example, a platoon member may exit from the platoon when travelling to a target location at which the platoon member needs to arrive. For ease of description, a platoon member that needs to exit is referred to as a first platoon member. Referring to FIG. 3, the first platoon member exits from the platoon through the following method. The method includes the following steps.

Step 301. The first platoon member sends an exit request message to the leading platoon member, where the exit request message includes a device identifier of the first platoon member.

Further, the first platoon member sends the exit request message to the leading platoon member based on a device identifier of the leading platoon member in a first member list stored by the first platoon member.

Step 302. The leading platoon member receives the exit request message, and sends a response message to the first platoon member.

The first platoon member exits from the platoon after receiving the response message.

Optionally, the leading platoon member may update stored lists after receiving the exit request message. The lists may include the first member list, a global communication quality table, a first communication quality table and/or a second communication quality table, and the like.

In an implementation, the leading platoon member may delete the device identifier of the first platoon member from the first member list, delete a record including the device identifier of the first platoon member from the global communication quality table, delete the record including the device identifier of the first platoon member from the first communication quality table, and/or delete the record including the device identifier of the first platoon member from the second communication quality table.

Optionally, after receiving the exit request message, the leading platoon member further needs to instruct the other platoon member in the platoon to update a list stored by the other platoon member, and instruct an application server to update the stored first member list of the platoon. A detailed implementation process is as follows.

Step 303. The leading platoon member broadcasts a notification message to the other platoon member included in the platoon, and sends a third group update message to the application server in the Internet of vehicles.

The notification message includes the device identifier of the first platoon member. The third group update message includes a group identifier of the platoon and the device identifier of the first platoon member, or the third group update message includes the group identifier of the platoon and a first member list. In this case, the first member list does not include the device identifier of the first platoon member.

Any other platoon member in the platoon that is different from the leading platoon member may receive the notification message, and perform the following operations.

Step 304. The other platoon member receives the notification message, and updates the stored lists based on the device identifier of the first platoon member that is included in the notification message.

The lists stored by the other platoon member may include the first member list, the global communication quality table, the first communication quality table and/or the second communication quality table, and the like.

In an implementation, the other platoon member may delete the device identifier of the first platoon member from the first member list, delete the record including the device identifier of the first platoon member from the global communication quality table, delete the record including the device identifier of the first platoon member from the first communication quality table, and/or delete the record including the device identifier of the first platoon member from the second communication quality table.

Step 305. The application server receives the third group update message, and updates the first member list of the platoon based on the third group update message.

Further, if the third group update message includes the group identifier of the platoon and the device identifier of the first platoon member, the application server deletes the device identifier of the first platoon member from the first member list corresponding to the group identifier. If the third group update message includes the group identifier of the platoon and the first member list, the application server updates the first member list corresponding to the group identifier to the first member list included in the third group update message.

In this embodiment of this application, after the first platoon member exits from the platoon, the leading platoon member sends the notification message to the other platoon member in the platoon, and sends the third group update message to the application server such that the first member list is updated to each platoon member in the platoon and the application server, and a platoon status is updated to each platoon member in the platoon in a timely manner.

Figure 4:
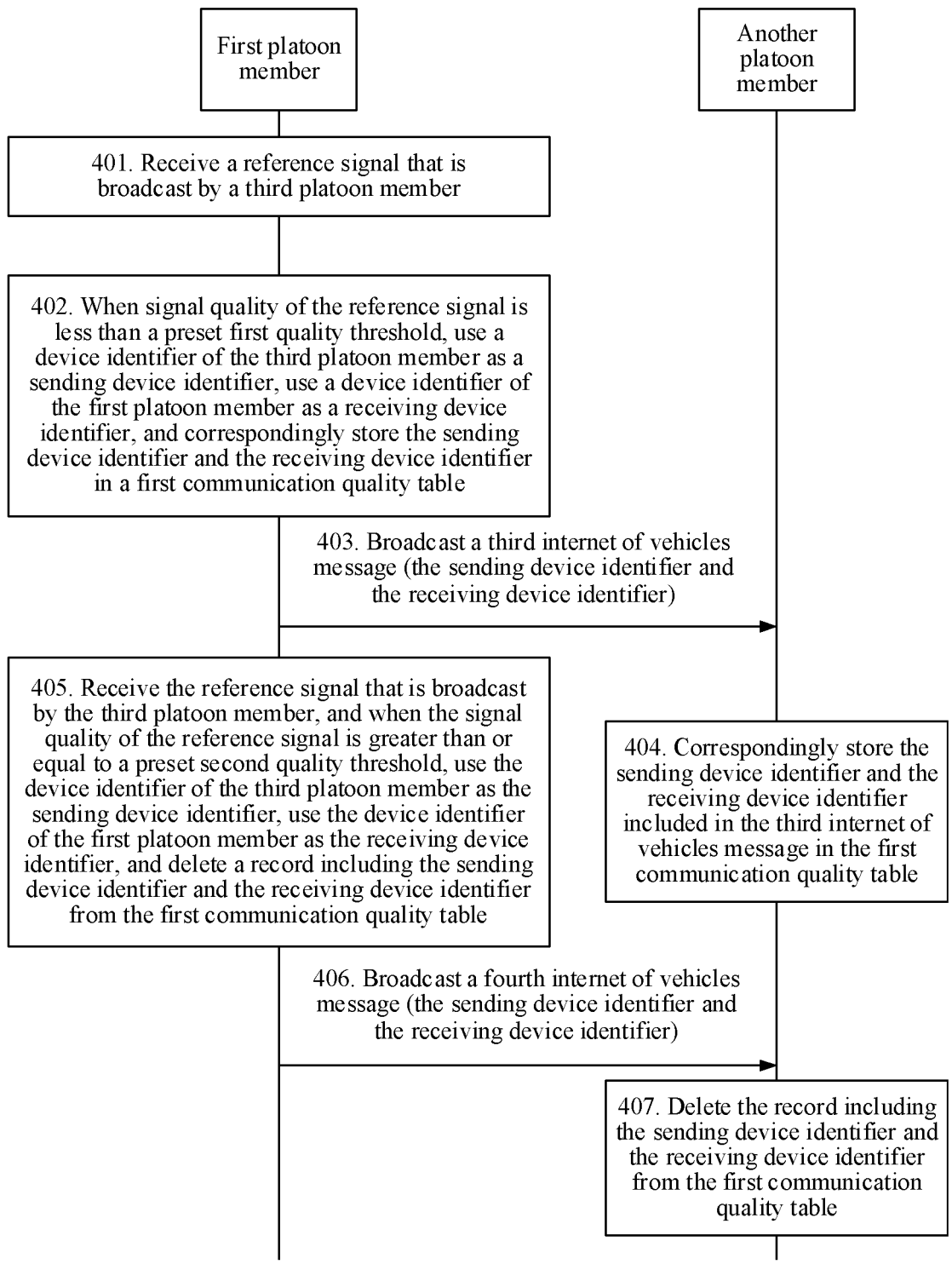
FIG. 4 is a flowchart of a method for updating a first communication quality table according to an embodiment of this application.

Referring to FIG. 4, an embodiment of this application provides a method for updating a first communication quality table. The method may be applied to the network architecture provided in any one of the embodiments shown in FIG. 1A to FIG. 1D. The method includes the following steps.

Step 401. A first platoon member receives a reference signal that is broadcast by a third platoon member, where the first platoon member is any platoon member in a platoon, and the third platoon member is any other platoon member in the platoon that is different from the first platoon member.

Each platoon member in the platoon may periodically broadcast the reference signal. For ease of description, any platoon member in the platoon is referred to as the first platoon member. The first platoon member may receive the reference signal that is broadcast by any other platoon member. When receiving the reference signal that is broadcast by another platoon member, this step may be performed.

Step 402. When signal quality of the reference signal is less than a first preset quality threshold, the first platoon member uses a device identifier of the third platoon member as a sending device identifier, uses a device identifier of the first platoon member as a receiving device identifier, and correspondingly stores the sending device identifier and the receiving device identifier in the first communication quality table.

In a platoon traveling process, signal quality of a communication link from the third platoon member to the first platoon member may become poor due to obstacle blocking. Consequently, the signal quality of the reference signal that is broadcast by the third platoon member and that is received by the first platoon member is relatively poor and is less than the first preset quality threshold. It indicates that the first platoon member detects that the signal quality of the communication link from the third platoon member to the first platoon member is less than the first preset quality threshold.

Optionally, if the first platoon member further stores a second communication quality table, the first platoon member further needs to update the second communication quality table. An update process may be as follows.

After correspondingly storing the sending device identifier and the receiving device identifier in the first communication quality table, the first platoon member may further remove records in the first communication quality table from a global communication quality table to obtain a new second communication quality table, and update the stored second communication quality table to the new second communication quality table, or the first platoon member directly deletes a record including the sending device identifier and the receiving device identifier from the stored second communication quality table.

Step 403. The first platoon member broadcasts a third Internet of vehicles message to another platoon member in the platoon, where the third Internet of vehicles message includes the sending device identifier and the receiving device identifier.

Optionally, before broadcasting the third Internet of vehicles message, the first platoon member may generate Internet of vehicles message including an event type, the sending device identifier, and the receiving device identifier. The event type is a communication quality deterioration type, and the communication quality deterioration type is used to identify the Internet of vehicles message as the third Internet of vehicles message.

For any other platoon member in the platoon, after receiving the third Internet of vehicles message, the platoon member performs the following operation.

Step 404. The other platoon member receives the third Internet of vehicles message, and correspondingly stores the sending device identifier and the receiving device identifier included in the third Internet of vehicles message in the first communication quality table.

Optionally, if the other platoon member further stores the second communication quality table, the other platoon member further needs to update the second communication quality table. An update process may be as follows.

After correspondingly storing the sending device identifier and the receiving device identifier in the first communication quality table, the other platoon member may further remove the records in the first communication quality table from the global communication quality table to obtain the new second communication quality table, and update the stored second communication quality table to the new second communication quality table, or the other platoon member directly deletes the record including the sending device identifier and the receiving device identifier from the stored second communication quality table.

The signal quality of the communication link from the first platoon member to the third platoon member may still be relatively good. In other words, the signal quality of the communication link may still be greater than or equal to the first preset quality threshold. In this way, the third platoon member also receives the third Internet of vehicles message that is broadcast by the first platoon member, and then updates the first communication quality table in this step. Alternatively, the signal quality of the communication link from the first platoon member to the third platoon member may become relatively poor. The signal quality of the communication link may still be less than the first preset quality threshold. However, the third platoon member may also receive the third Internet of vehicles message that is broadcast by the first platoon member, and also update the first communication quality table in this step.

When the platoon continues to travel, the signal quality of the communication link from the third platoon member to the first platoon member may become better. In other words, the signal quality of the communication link is greater than or equal to a second preset quality threshold, and the second preset quality threshold is greater than or equal to the first preset quality threshold. In this way, the first platoon member may continue to perform the following operations.

Step 405. The first platoon member receives the reference signal that is broadcast by the third platoon member. When the signal quality of the reference signal is greater than or equal to the second preset quality threshold, the first platoon member uses the device identifier of the third platoon member as the sending device identifier, uses the device identifier of the first platoon member as the receiving device identifier, and deletes the record including the sending device identifier and the receiving device identifier from the first communication quality table.

When the signal quality of the reference signal is greater than or equal to the second preset quality threshold, it indicates that the first platoon member detects that the signal quality of the communication link from the third platoon member to the first platoon member is greater than or equal to the second preset quality threshold.

Optionally, if the first platoon member further stores the second communication quality table, the first platoon member further needs to update the second communication quality table. An update process may be as follows.

After deleting the record including the sending device identifier and the receiving device identifier from the first communication quality table, the first platoon member may further remove records in the first communication quality table from the global communication quality table to obtain a new second communication quality table, and update the stored second communication quality table to the new second communication quality table, or the first platoon member correspondingly stores the sending device identifier and the receiving device identifier as one record in the stored second communication quality table.

Step 406. The first platoon member broadcasts a fourth Internet of vehicles message to the other platoon member in the platoon, where the fourth Internet of vehicles message includes the sending device identifier and the receiving device identifier.

Optionally, before broadcasting the fourth Internet of vehicles message, the first platoon member may generate Internet of vehicles message including an event type, the sending device identifier, and the receiving device identifier. The event type is a communication quality improvement type, and the communication quality improvement type is used to identify the Internet of vehicles message as the fourth Internet of vehicles message.

For any other platoon member in the platoon, after receiving the fourth Internet of vehicles message, the platoon member performs the following operation.

Step 407. The other platoon member receives the fourth Internet of vehicles message, where the fourth Internet of vehicles message includes the sending device identifier and the receiving device identifier, and deletes the record including the sending device identifier and the receiving device identifier from the first communication quality table.

Optionally, if the other platoon member further stores the second communication quality table, the other platoon member further needs to update the second communication quality table. An update process may be as follows.

After deleting the record including the sending device identifier and the receiving device identifier from the first communication quality table, the other platoon member may further delete records in the first communication quality table from the global communication quality table to obtain a new second communication quality table, and update the stored second communication quality table to the new second communication quality table, or the other platoon member may correspondingly store the sending device identifier and the receiving device identifier as one record in the stored second communication quality table.

In this embodiment of this application, when the first platoon member detects that the signal quality of the communication link from the third platoon member to the first platoon member is less than the first preset quality threshold, in other words, the communication link becomes worse, the first platoon member updates the first communication quality table stored by the first platoon member and the first communication quality table stored by the other platoon member. Alternatively, when the first platoon member detects that the signal quality of the communication link from the third platoon member to the first platoon member is greater than or equal to the second preset quality threshold, in other words, the communication link becomes better, the first platoon member also updates the first communication quality table stored by the first platoon member and the first communication quality table stored by the other platoon member. Therefore, a communication quality event is shared in the platoon.

Figure 5:
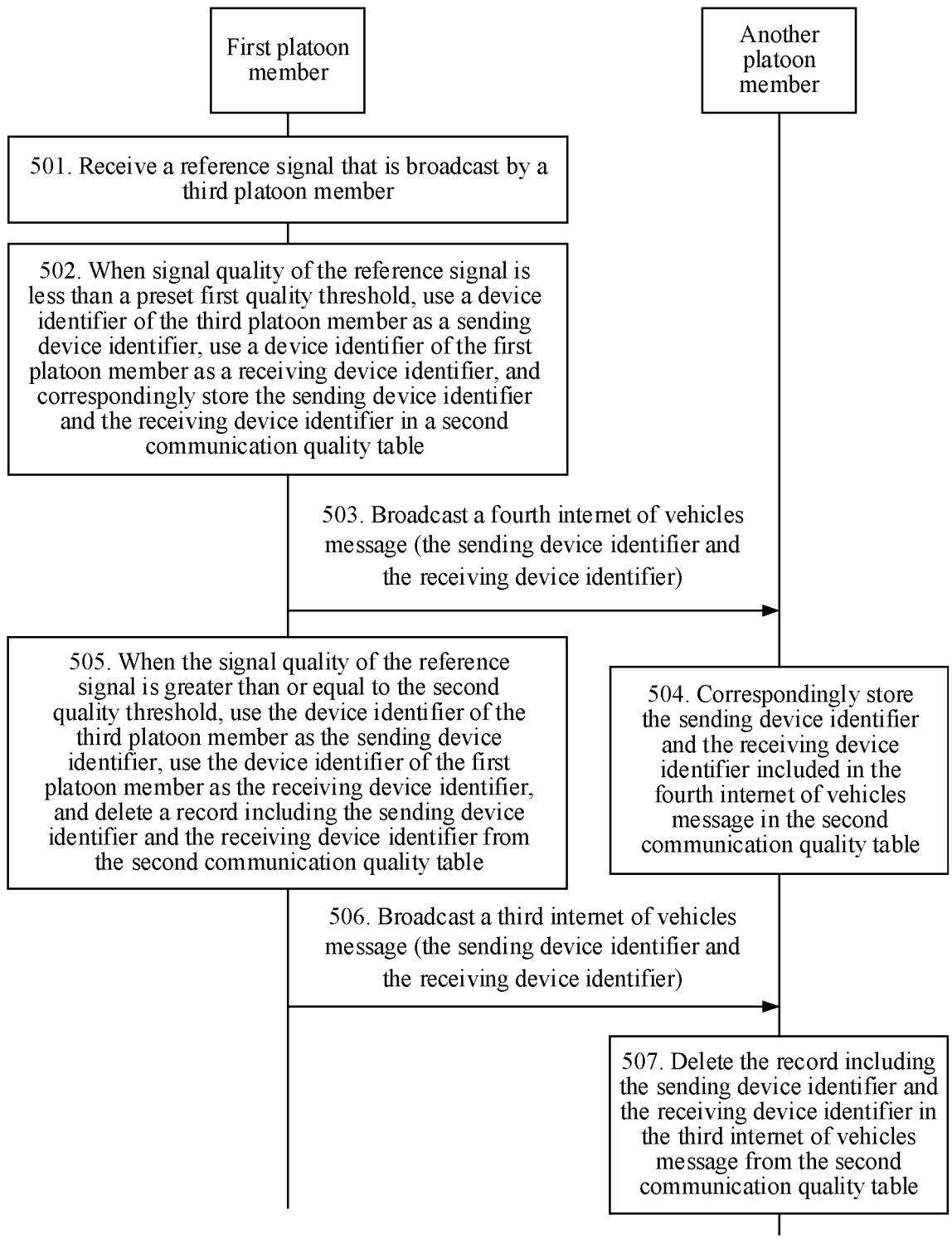
FIG. 5 is a flowchart of a method for updating a second communication quality table according to an embodiment of this application.

Referring to FIG. 5, an embodiment of this application provides a method for updating a second communication quality table. The method may be applied to the network architecture provided in any one of the embodiments shown in FIG. 1A to FIG. 1D. The method includes the following steps.

Step 501. A first platoon member receives a reference signal that is broadcast by a third platoon member, where the first platoon member is any platoon member in a platoon, and the third platoon member is any other platoon member in the platoon that is different from the first platoon member.

Each platoon member in the platoon periodically broadcasts the reference signal. For ease of description, any platoon member in the platoon is referred to as the first platoon member. The first platoon member may receive the reference signal that is broadcast by any another platoon member. When receiving the reference signal that is broadcast by another platoon member, this step may be performed.

Step 502. When signal quality of the reference signal is greater than or equal to a second preset quality threshold, the first platoon member uses a device identifier of the third platoon member as a sending device identifier, uses a device identifier of the first platoon member as a receiving device identifier, and correspondingly stores the sending device identifier and the receiving device identifier in the second communication quality table.

Optionally, before correspondingly storing the sending device identifier and the receiving device identifier in the second communication quality table, the first platoon member may determine whether the second communication quality table includes a record including the sending device identifier and the receiving device identifier. If the second communication quality table does not include the record including the sending device identifier and the receiving device identifier, the sending device identifier and the receiving device identifier are correspondingly stored in the second communication quality table, or if the second communication quality table includes the record including the sending device identifier and the receiving device identifier, execution may be ended.

Optionally, if the first platoon member further stores a first communication quality table, the first platoon member further needs to update the first communication quality table. An update process may be as follows.

After correspondingly storing the sending device identifier and the receiving device identifier in the second communication quality table, the first platoon member may further remove records in the second communication quality table from a global communication quality table to obtain a new first communication quality table, and update the stored first communication quality table to the new first communication quality table, or the first platoon member deletes a record including the sending device identifier and the receiving device identifier from the first communication quality table.

Step 503. The first platoon member broadcasts a fourth Internet of vehicles message to another platoon member in the platoon, where the fourth Internet of vehicles message includes the sending device identifier and the receiving device identifier.

Optionally, before broadcasting the fourth Internet of vehicles message, the first platoon member may generate Internet of vehicles message including an event type, the sending device identifier, and the receiving device identifier. The event type is a communication quality improvement type, and the communication quality improvement type is used to identify the Internet of vehicles message as the fourth Internet of vehicles message.

For any other platoon member in the platoon, after receiving the fourth Internet of vehicles message, the platoon member performs the following operation.

Step 504. The other platoon member receives the fourth Internet of vehicles message, and correspondingly stores the sending device identifier and the receiving device identifier included in the fourth Internet of vehicles message in the second communication quality table.

Optionally, if the other platoon member further stores the first communication quality table, the other platoon member further needs to update the second communication quality table. An update process may be as follows.

After correspondingly storing the sending device identifier and the receiving device identifier in the second communication quality table, the other platoon member may further remove records in the second communication quality table from the global communication quality table to obtain a new first communication quality table, and update the stored first communication quality table to the new first communication quality table, or the first platoon member deletes a record including the sending device identifier and the receiving device identifier from the first communication quality table.

In a platoon traveling process, the first platoon member may detect that signal quality of a communication link from the third platoon member to the first platoon member is less than a first preset quality threshold, in other words, the signal quality of the received reference signal that is broadcast by the third platoon member is less than the first preset quality threshold. In this case, the first platoon member also needs to update the second communication quality table, and an update process is as follows.

Step 505. The first platoon member receives the reference signal that is broadcast by the third platoon member. When the signal quality of the reference signal is less than the first preset quality threshold, the first platoon member uses the device identifier of the third platoon member as the sending device identifier, uses the device identifier of the first platoon member as the receiving device identifier, and deletes a record including the sending device identifier and the receiving device identifier from the second communication quality table.

When the signal quality of the reference signal is less than the second preset quality threshold, it indicates that the first platoon member detects that the signal quality of the communication link from the first platoon member to the third platoon member is less than the second preset quality threshold.

Optionally, if the first platoon member further stores the first communication quality table, the first platoon member further needs to update the first communication quality table. An update process may be as follows.

After deleting the record including the sending device identifier and the receiving device identifier from the second communication quality table, the first platoon member may further remove records in the second communication quality table from the global communication quality table to obtain a new first communication quality table, and updates the stored first communication quality table to the new first communication quality table, or the first platoon member correspondingly stores the sending device identifier and the receiving device identifier as one record in the stored first communication quality table.

Step 506. The first platoon member broadcasts a third Internet of vehicles message to the other platoon member in the platoon, where the third Internet of vehicles message includes the sending device identifier and the receiving device identifier.

Optionally, before broadcasting the third Internet of vehicles message, the first platoon member may generate Internet of vehicles message including an event type, the sending device identifier, and the receiving device identifier. The event type is a communication quality deterioration type, and the communication quality deterioration type is used to identify the Internet of vehicles message as the third Internet of vehicles message.

For any other platoon member in the platoon, after receiving the third Internet of vehicles message, the platoon member performs the following operation.

Step 507. The other platoon member receives the third Internet of vehicles message, where the third Internet of vehicles message includes the sending device identifier and the receiving device identifier, and deletes the record including the sending device identifier and the receiving device identifier from the second communication quality table.

Optionally, if the other platoon member further stores the first communication quality table, the other platoon member further needs to update the first communication quality table. An update process may be as follows.

After deleting the record including the sending device identifier and the receiving device identifier from the second communication quality table, the other platoon member may further delete records in the second communication quality table from the global communication quality table to obtain a new first communication quality table, and update the stored first communication quality table to the new first communication quality table, or the other platoon member may correspondingly store the sending device identifier and the receiving device identifier as one record in the stored first communication quality table.

In this embodiment of this application, when detecting that the signal quality of the communication link from the third platoon member to the first platoon member is greater than or equal to the second preset quality threshold, the first platoon member may update the second communication quality table stored by the first platoon member and the second communication quality table stored by the other platoon member. Therefore, a communication quality event is shared in the platoon.

Figure 6:
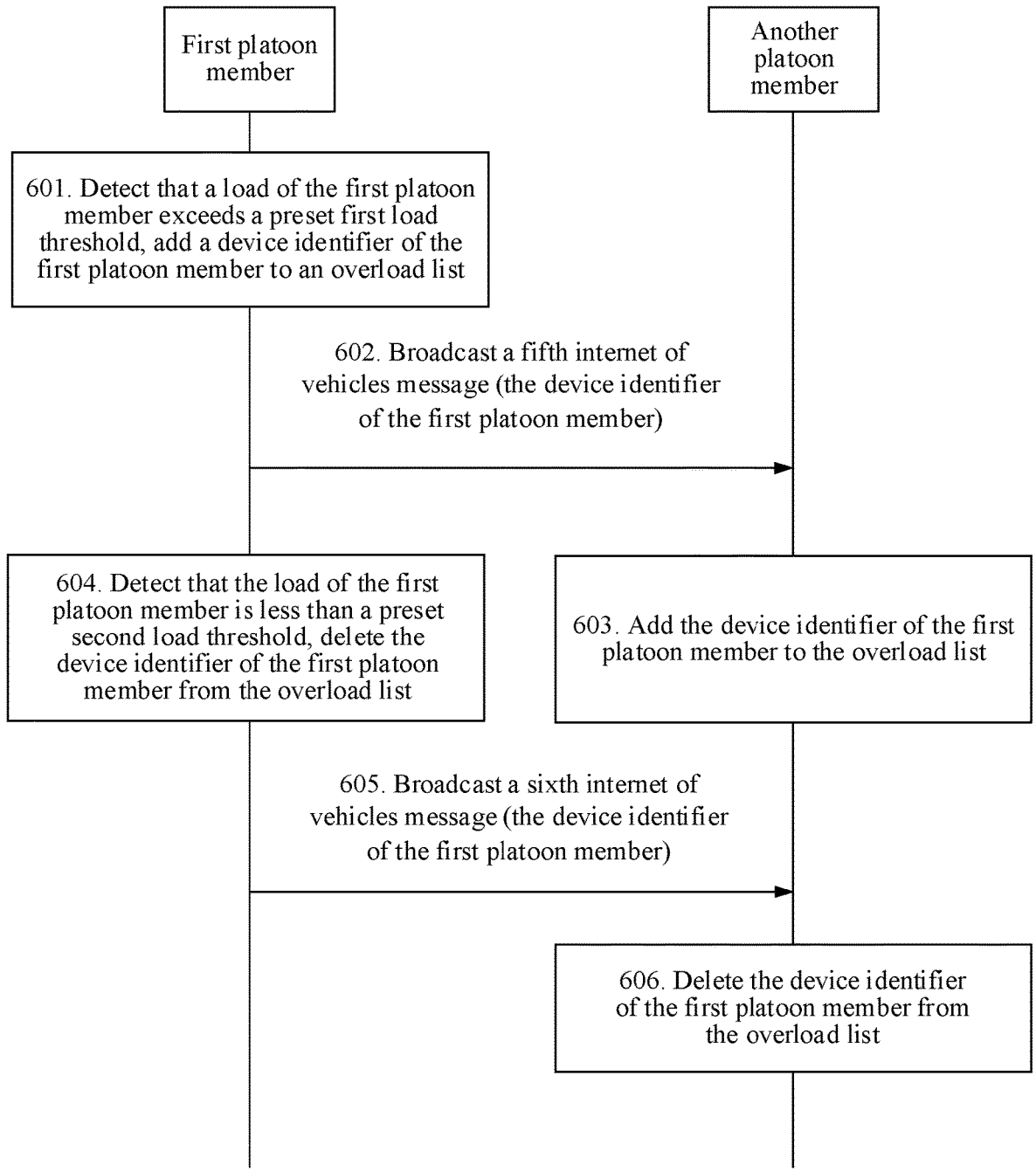
FIG. 6 is a flowchart of a method for updating an overload list according to an embodiment of this application.

Referring to FIG. 6, an embodiment of this application provides a method for updating an overload list. The method may be applied to the network architecture provided in any one of the embodiments shown in FIG. 1A to FIG. 1D. The method includes the following steps.

Step 601. When a first platoon member detects that a load of the first platoon member exceeds a first preset load threshold, the first platoon member adds a device identifier of the first platoon member to an overload list stored by the first platoon member, where the first platoon member is any platoon member in a platoon.

Step 602. The first platoon member broadcasts a fifth Internet of vehicles message to another platoon member in the platoon, where the fifth Internet of vehicles message includes the device identifier of the first platoon member.

Optionally, before broadcasting the fifth Internet of vehicles message, the first platoon member generates an Internet of vehicles message including an event type and the device identifier of the first platoon member. The event type is a load increasing type, and the load increasing type is used to identify the Internet of vehicles message as the fifth Internet of vehicles message.

For any other platoon member in the platoon, after receiving the fifth Internet of vehicles message, the platoon member performs the following operation.

Step 603. The other platoon member receives the fifth Internet of vehicles message, and adds the device identifier of the first platoon member in the fifth Internet of vehicles message to an overload list stored by the other platoon member.

After the first platoon member detects that the load of the first platoon member exceeds the first preset load threshold, the load of the first platoon member may decrease. When the load of the first platoon member decreases to be less than a second preset load threshold, the following operations may be performed. The first preset load threshold is greater than or equal to the second preset load threshold.

Step 604. When the first platoon member detects that the load of the first platoon member is less than the second preset load threshold, the first platoon member deletes the device identifier of the first platoon member from the overload list stored by the first platoon member.

Step 605. The first platoon member broadcasts a sixth Internet of vehicles message to the other platoon member in the platoon, where the sixth Internet of vehicles message includes the device identifier of the first platoon member.

Optionally, before broadcasting the sixth Internet of vehicles message, the first platoon member generates an Internet of vehicles message including an event type and the device identifier of the first platoon member. The event type is a load decreasing type, and the load decreasing type is used to identify the Internet of vehicles message as the sixth Internet of vehicles message.

For any other platoon member in the platoon, after receiving the sixth Internet of vehicles message, the platoon member performs the following operation.

Step 606. The other platoon member receives the sixth Internet of vehicles message, and deletes the device identifier of the first platoon member included in the sixth Internet of vehicles message from the overload list stored by the other platoon member.

In this embodiment of this application, when detecting that the load of the first platoon member exceeds the first preset load threshold or when detecting that the load of the first platoon member decreases to the first preset load threshold, the first platoon member updates the overload list of the first platoon member, and sends an Internet of vehicles message to the other platoon member such that the other platoon member also updates the overload list. In this way, when a target communications node is selected, a platoon member with an excessively heavy load is prevented from being selected, and forwarding is prevented from being affected.

Figure 7A:
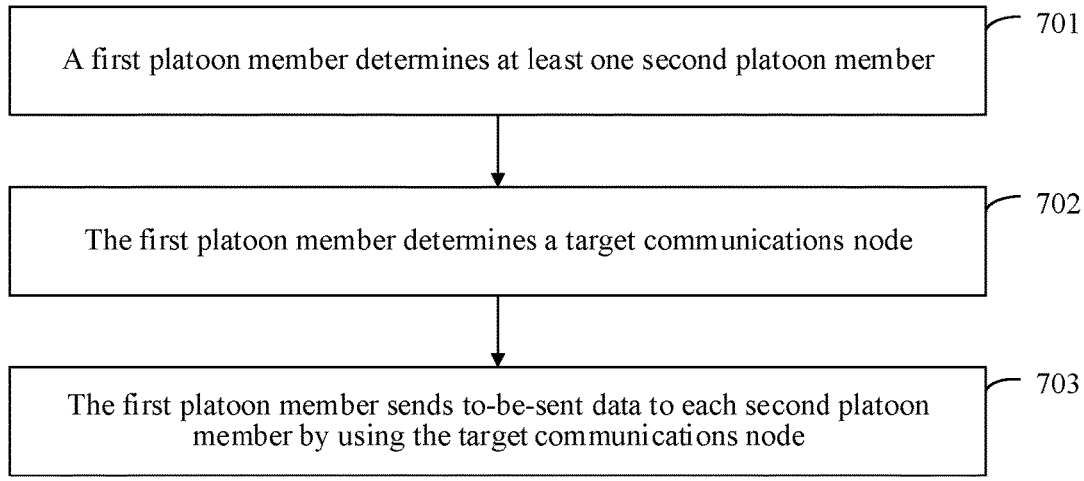
FIG. 7A is a flowchart of a communications method according to an embodiment of this application.

Referring to FIG. 7A, an embodiment of this application provides a communications method. The method may be applied to the network architecture provided in any one of the embodiments shown in FIG. 1A to FIG. 1D. For ease of description, any platoon member in a platoon is referred to as a first platoon member. The first platoon member may send, to another platoon member in the platoon through the method, to-be-sent data that needs to be sent. Referring to FIG. 7A, the method includes the following steps.

Step 701. The first platoon member determines at least one second platoon member, where the first platoon member and the at least one second platoon member belong to a same platoon, and signal quality of a communication link from the first platoon member to each second platoon member is less than a first preset quality threshold.

The signal quality of the communication link from the first platoon member to each second platoon member may become poor due to reasons such as obstacle blocking. Consequently, the signal quality of the communication link from the first platoon member to each second platoon member is less than the first preset quality threshold. As a result, after the first platoon member broadcasts a message, the second platoon member may fail to receive the message.

The first platoon member may determine the at least one second platoon member in a plurality of manners. The following two manners are illustrated in this step, and other manners are not illustrated one by one. The two manners are respectively as follows.

Manner 1. A device identifier of the first platoon member is determined as a sending device identifier, at least one corresponding receiving device identifier is obtained from a first communication quality table based on the sending device identifier, and a platoon member corresponding to each of the at least one receiving device identifier is determined as the second platoon member.

Each record in the first communication quality table includes a sending device identifier and a receiving device identifier, and signal quality of a communication link from a platoon member corresponding to the sending device identifier to a platoon member corresponding to the receiving device identifier is less than the first preset quality threshold. The first platoon member may maintain, through the embodiment shown in FIG. 4, the first communication quality table stored by the first platoon member.

For example, assuming that the first platoon member is a platoon member A, the device identifier of the first platoon member is an IDA. The IDA is used as a sending device identifier. Corresponding device identifiers IDB and IDC are obtained from the first communication quality table shown in Table 2 based on the sending device identifier IDA. A platoon member B corresponding to the IDB and a platoon member C corresponding to the IDC are determined as the second platoon members.

Manner 2. A device identifier of the first platoon member is determined as a sending device identifier, at least one corresponding receiving device identifier is obtained from a second communication quality table based on the sending device identifier, and the device identifier of the first platoon member and the at least one receiving device identifier are removed from a first member list to obtain a second member list. A platoon member corresponding to each device identifier in the second member list is the second platoon member.

The first member list includes a device identifier of each platoon member in the platoon. Each record in the second communication quality table includes a sending device identifier and a receiving device identifier, and signal quality of a communication link from a platoon member corresponding to the sending device identifier to a platoon member corresponding to the receiving device identifier is greater than or equal to the first preset quality threshold. The first platoon member may maintain, through the embodiment shown in FIG. 5, the second communication quality table stored by the first platoon member.

For example, the first member list includes a device identifier IDA of a platoon member A, a device identifier IDB of a platoon member B, a device identifier IDC of a platoon member C, a device identifier IDD of a platoon member D, and a device identifier IDE of a platoon member E. Assuming that the first platoon member is the platoon member A, the device identifier of the first platoon member is the IDA. The IDA is used as a sending device identifier. The corresponding device identifiers IDD and IDE are obtained from the second communication quality table shown in Table 3 based on the sending device identifier IDA. The device identifier IDA of the first platoon member and the obtained IDD and IDE are removed from the first member list to obtain a second member list including the device identifiers IDB and IDC. The platoon member B corresponding to the IDB and the platoon member C corresponding to the IDC are determined as the second platoon members.

Step 702. The first platoon member determines a target communications node, where signal quality of a communication link from the target communications node to each second platoon member is greater than or equal to the first preset quality threshold.

The target communications node may be at least one platoon member in the platoon, or the target communications node may be an application server in the Internet of vehicles.

When the target communications node is a platoon member, the target communications node meets the following constraints. Signal quality of a communication link from the first platoon member to the target communications node is greater than or equal to the first preset quality threshold, and the signal quality of the communication link from the target communications node to each second platoon member is greater than or equal to the first preset quality threshold. Therefore, after the first platoon member sends data to the target communications node, the data can be successfully received by the target communications node. After the target communications node sends the data to each second platoon member, the data can be successfully received by each second platoon member.

When the target communications node is the application server, because each platoon member in the platoon may communicate with the application server in a Uu communication manner, a communication link between the first platoon member and the application server is relatively reliable, and a communication link between each second platoon member and the application server is also relatively reliable. Therefore, after the first platoon member sends data to the application server, the data can be successfully received by the application server. After the application server sends the data to each second platoon member, the data can be successfully received by each second platoon member.

In this step, the first platoon member may first find at least one platoon member that meets the foregoing constraints, to serve as the target communications node. If the platoon does not include a platoon member that meets the foregoing constraints, the application server in the Internet of vehicles may be selected as the target communications node. Alternatively, the first platoon member directly selects the application server as the target communications node.

Optionally, there may be a plurality of manners in which the first platoon member finds the at least one platoon member that meets the foregoing constraints, to serve as the target communications node. The following two manners are illustrated in this step, and other manners are not illustrated one by one. The two manners are respectively as follows.

Manner 1. A device identifier of each second platoon member is used as a receiving device identifier, and at least one corresponding sending device identifier is obtained from the first communication quality table based on the receiving device identifier. The at least one sending device identifier and the device identifier of each second platoon member are removed from the first member list to obtain a third member list. One or more platoon members are selected from platoon members corresponding to device identifiers in the third member list, to serve as the target communications node.

For example, the first member list includes the device identifiers IDA, IDB, IDC, IDD, and IDE. The device identifiers IDB and IDC of the second platoon members are used as receiving device identifiers. The corresponding sending device identifier IDA is obtained from the first communication quality table shown in Table 2 based on the receiving device identifier IDB, and the corresponding sending device identifier IDA is obtained from the first communication quality table shown in Table 2 based on the receiving device identifier IDC. The obtained device identifier IDA and the device identifiers IDB and IDC of the second platoon members are removed from the first member list to obtain the third member list including the device identifiers IDD and IDE. One or two of the platoon member D corresponding to the IDD and the platoon member E corresponding to the IDE are selected from the third member list, to serve as the target communications node.

Manner 2. The device identifier of the first platoon member is used as the sending device identifier, and the at least one corresponding receiving device identifier is obtained from the second communication quality table based on the sending device identifier. A device identifier of each second platoon member is used as a receiving device identifier, and at least one corresponding sending device identifier is obtained from the second communication quality table based on the receiving device identifier. An intersection set of a receiving member list and a sending member list is calculated to obtain a third member list. The receiving member list includes the at least one receiving device identifier, and the sending member list includes the at least one sending device identifier. One or more platoon members are selected from platoon members corresponding to device identifiers in the third member list, to serve as the target communications node.

For example, the device identifier IDA of the first platoon member is used as a sending device identifier, and the corresponding receiving device identifiers obtained from the second communication quality table shown in Table 3 based on the sending device identifier IDA are respectively the IDD and the IDE. Therefore, the obtained receiving member list includes the receiving device identifiers IDD and IDE. The device identifiers IDB and IDC of the second platoon members are used as receiving device identifiers, the corresponding sending device identifiers obtained from the second communication quality table shown in Table 3 based on the receiving device identifier IDB are respectively the IDC, the IDD, and the IDE, and the corresponding sending device identifiers obtained from the second communication quality table shown in Table 3 based on the receiving device identifier IDC are respectively the IDB, the IDD, and the IDE. Therefore, the obtained sending member list includes the device identifiers IDB, IDC, IDD, and IDE. The intersection set of the receiving member list and the sending member list is calculated to obtain the third member list including the IDD and the IDE. One or two of the platoon member D corresponding to the IDD and the platoon member E corresponding to the IDE are selected from the third member list, to serve as the target communications node.

Optionally, the operation of selecting one or more of platoon members corresponding to device identifiers in the third member list as one or more target communications nodes may be as follows.

The platoon members corresponding to the device identifiers in the third member list may be determined. Priorities of the determined platoon members are set. One or more platoon members with a highest priority are selected from the determined platoon members as the target communications node.

When the priorities of the platoon members are set, if the platoon members include a leading platoon member in the platoon, a priority of the leading platoon member may be set to be less than a priority of another platoon member. If the platoon members include a platoon member whose load exceeds a first preset load threshold, a priority of the platoon member is set to be less than a priority of another platoon member. If the platoon members include both the platoon member whose load exceeds the first preset load threshold and the leading platoon member, the priority of the platoon member and the priority of the leading platoon member each are set to be less than a priority of another platoon member, and the priority of the platoon member may be set to be greater than, equal to, or less than the priority of the leading platoon member.

In this step, when the platoon members corresponding to the device identifiers in the third member list include only the platoon member whose load exceeds the first preset load threshold and/or the leading platoon member, the platoon member and/or the leading platoon member may be selected as the target communications node.

If the platoon members corresponding to the device identifiers in the third member list include at least one platoon member, where signal quality of a communication link from the at least one platoon member to each second platoon member is greater than or equal to the first preset quality threshold, one platoon member may be selected from the at least one platoon member as the target communications node. During selection, the target communications node may be selected from the at least one platoon member in an alternate selection manner. The following uses an example to describe the alternate selection manner. Assuming that the at least one platoon member includes the platoon members D and E, and assuming that the first platoon member has previously selected the platoon member D as the target communications node, the first platoon member selects the platoon member E as the target communications node currently, and may select the platoon member D as the target communications node next time.

If the platoon members corresponding to the device identifiers in the third member list do not include a platoon member, where signal quality of a communication link from the platoon member to each second platoon member is greater than or equal to the first preset quality threshold, a plurality of platoon members may be selected as the target communications nodes. In this way, after the first platoon member forwards, through the plurality of target communications nodes, data sent by the first platoon member, the data can be successively received by each second platoon member. For example, the second platoon members are the platoon members B and C, and the platoon members corresponding to the device identifiers in the third member list are the platoon members D and E. It is assumed that signal quality of a communication link from the platoon member D to the platoon member B is greater than or equal to the first preset quality threshold, but signal quality of a communication link from the platoon member D to the platoon member C is less than the first preset quality threshold. In addition, it is assumed that signal quality of a communication link from the platoon member E to the platoon member C is greater than or equal to the first preset quality threshold, but signal quality of a communication link from the platoon member E to the platoon member B is less than the first preset quality threshold. In this case, the platoon members D and E may be selected as the target communications nodes. After the first platoon member forwards, through the target communications nodes D and E, the data sent by the first platoon member, the data can be successfully received by the second platoon members B and C.

Optionally, before the target communications node is selected from the third member list, the device identifier of the platoon member whose load exceeds the first preset load threshold and/or a device identifier of the leading platoon member in the platoon may be removed from the third member list, and then the target communications node is selected from the platoon members corresponding to the device identifiers in the third member list.

Optionally, when the third member list is empty, it indicates that the platoon does not include a platoon member that meets the foregoing constraints, or it indicates that a platoon member that meets the foregoing constraints in the platoon is the platoon member whose load exceeds the first preset load threshold and/or the leading platoon member in the platoon, and is removed from the third member list.

Optionally, in this step, when the third member list is empty, the application server in the Internet of vehicles may be determined as the target communications node.

Step 703. The first platoon member sends to-be-sent data to each second platoon member through the target communications node.

The target communications node may be one or more platoon members in the platoon, or may be the application server in the Internet of vehicles.

When the target communications node is the one or more platoon members in the platoon, the first platoon member may send the to-be-sent data to each second platoon member in the following two manners through the target communications node. The two manners are respectively as follows.

Figure 7B:
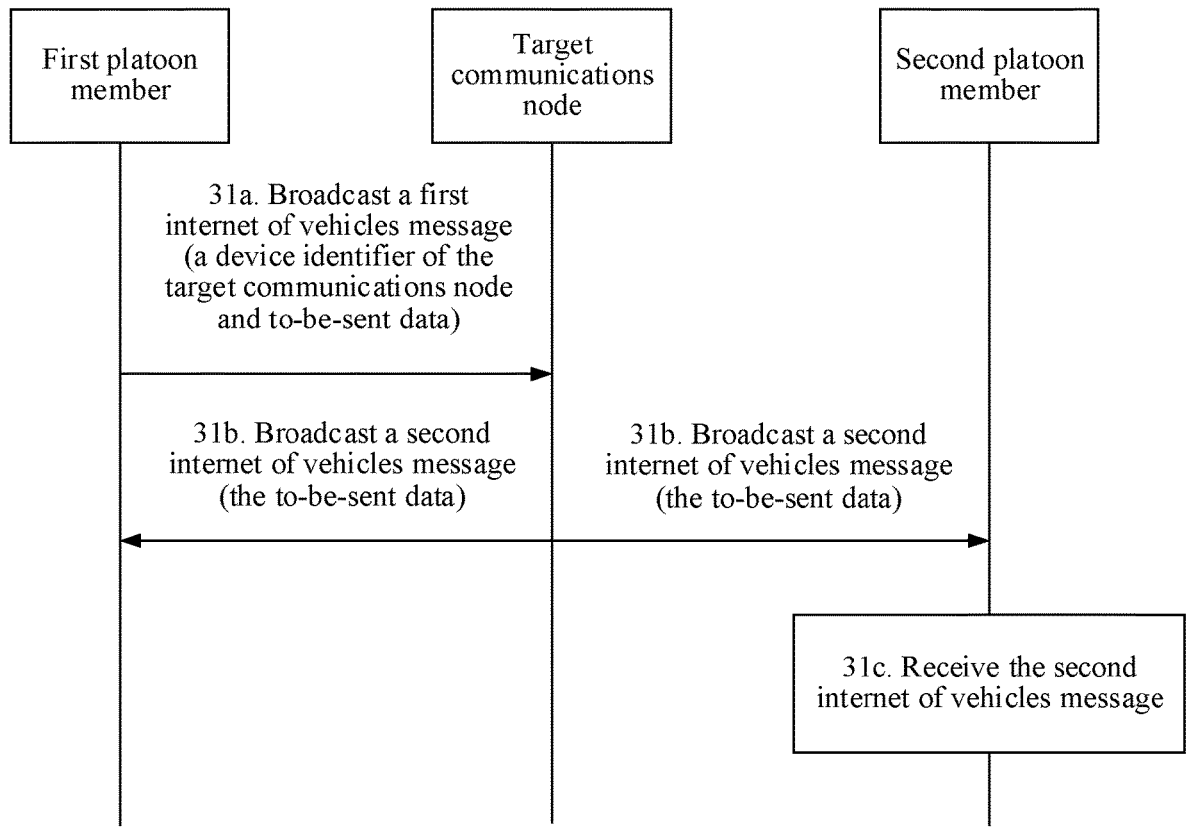
FIG. 7B is a flowchart of another communications method according to an embodiment of this application.

Manner 1. The first platoon member broadcasts the to-be-sent data, and the target communications node receives the to-be-sent data and also broadcasts the to-be-sent data such that each second platoon member receives the to-be-sent data. Optionally, referring to FIG. 7B, the following steps 31a to 31c may be included in an implementation.

31a. The first platoon member broadcasts a first Internet of vehicles message to a platoon member included in the platoon, where the first Internet of vehicles message includes a device identifier of the target communications node and the to-be-sent data.

After the first platoon member broadcasts the first Internet of vehicles message, the platoon member in the platoon may receive the first Internet of vehicles message, and determine whether the device identifier of the target communications node that is included in the first Internet of vehicles message is the same as a device identifier of the platoon member. If the device identifier of the target communications node is different from the device identifier of the platoon member, it indicates that the platoon member is not the target communications node, and the platoon member processes the to-be-sent data. If the device identifier of the target communications node is the same as the device identifier of the platoon member, it indicates that the platoon member is the target communications node, and the platoon member further performs the following operation in addition to processing the to-be-sent data.

31b. When determining that the device identifier of the platoon member is the same as the device identifier of the target communications node that is included in the first Internet of vehicles message, the platoon member broadcasts a second Internet of vehicles message to a platoon member included in the platoon, where the second Internet of vehicles message includes the to-be-sent data.

Because the signal quality of the communication link from the target communications node to the second platoon member is greater than or equal to the first preset quality threshold, the second Internet of vehicles message that is broadcast by the target communications node can be successfully received by the second platoon member such that the first platoon member sends the to-be-sent data to the second platoon member through the target communications node. Therefore, a traffic accident is avoided.

After the target communications node broadcasts the second Internet of vehicles message, the first platoon member may receive the second Internet of vehicles message, and determine that the to-be-sent data included in the second Internet of vehicles message is data sent by the first platoon member. In this case, the first platoon member discards the second Internet of vehicles message. Another platoon member in the platoon receives the second Internet of vehicles message, and determines whether the to-be-sent data included in the second Internet of vehicles message has been received. If the to-be-sent data is received, the other platoon member discards the second Internet of vehicles message.

Optionally, the to-be-sent data includes a data identifier. After receiving the second Internet of vehicles message, the first platoon member may determine, through the data identifier of the to-be-sent data included in the second Internet of vehicles message, whether the to-be-sent data is the data that has been sent by the first platoon member.

In addition, after receiving the second Internet of vehicles message, the other platoon member may determine, through the data identifier of the to-be-sent data included in the second Internet of vehicles message, whether the to-be-sent data has been received.

Step 31c. The second platoon member receives the second Internet of vehicles message that is broadcast by the target communications node.

There may be a plurality of target communications nodes. For each second platoon member, the second platoon member may receive second Internet of vehicles messages that are broadcast by the plurality of target communications nodes. Therefore, when receiving a second Internet of vehicles message sent by a specific target communications node, the second platoon member determines whether to-be-sent data included in the second Internet of vehicles message has been received. If the to-be-sent data is not received, the second platoon member processes the to-be-sent data included in the second Internet of vehicles message, or if the to-be-sent data is received, the second platoon member discards the second Internet of vehicles message.

Figure 7C:
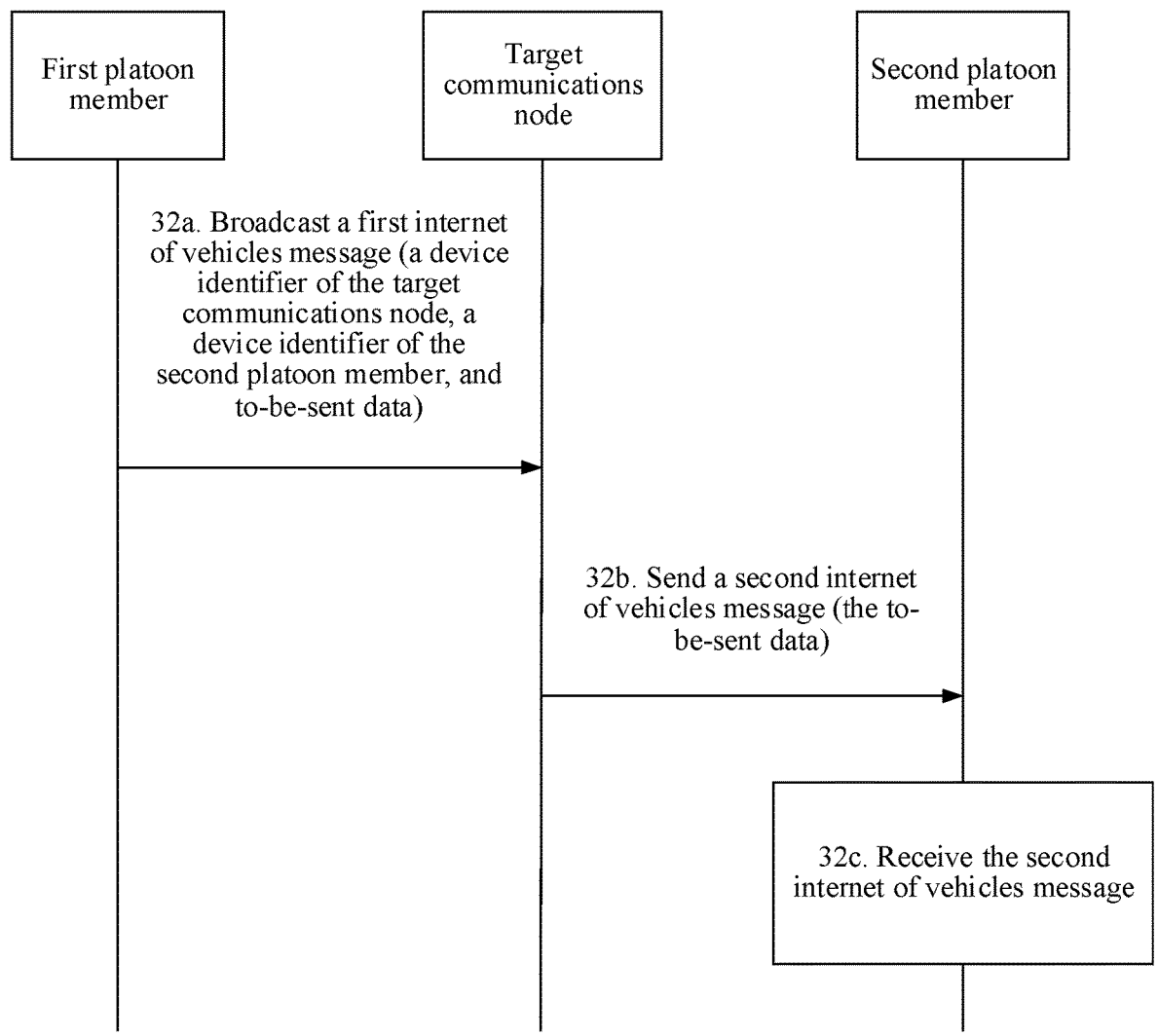
FIG. 7C is a flowchart of another communications method according to an embodiment of this application.

Manner 2. The first platoon member broadcasts the to-be-sent data and the device identifier of each second platoon member, and the target communications node receives the to-be-sent data, and sends the to-be-sent data to each second platoon member based on the device identifier of each second platoon member such that each second platoon member receives the to-be-sent data. Optionally, referring to FIG. 7C, the following steps 32a to 32c may be included in an implementation.

32a. The first platoon member broadcasts a first Internet of vehicles message to a platoon member included in the platoon, where the first Internet of vehicles message includes a device identifier of the target communications node, the device identifier of each second platoon member, and the to-be-sent data.

After the first platoon member broadcasts the first Internet of vehicles message, the platoon member in the platoon may receive the first Internet of vehicles message, and determine whether the device identifier of the target communications node that is included in the first Internet of vehicles message is the same as a device identifier of the platoon member. If the device identifier of the target communications node is different from the device identifier of the platoon member, it indicates that the platoon member is not the target communications node, and the platoon member processes the to-be-sent data. If the device identifier of the target communications node is the same as the device identifier of the platoon member, it indicates that the platoon member is the target communications node, and the platoon member further performs the following operation in addition to processing the to-be-sent data.

32b. When determining that the device identifier of the platoon member is the same as the device identifier of the target communications node that is included in the first Internet of vehicles message, the target communications node sends the to-be-sent data to each second platoon member based on the device identifier of each second platoon member that is included in the first Internet of vehicles message.

Because the signal quality of the communication link from the target communications node to the second platoon member is greater than or equal to the first preset quality threshold, the target communications node can successfully send the to-be-sent data to the second platoon member such that the first platoon member sends the to-be-sent data to the second platoon member through the target communications node. Therefore, a traffic accident is avoided.

In this step, the target communications node sends the to-be-sent data to the second platoon member based on the device identifier of the second platoon member. Compared with a broadcast manner, this can prevent the to-be-sent data from being sent to another platoon member in the platoon that is different from the second platoon member.

Step 32c. The second platoon member receives the to-be-sent data sent by the target communications node.

There may be a plurality of target communications nodes. For each second platoon member, the second platoon member may receive to-be-sent data sent by the plurality of target communications nodes. Therefore, when receiving to-be-sent data sent by a specific target communications node, the second platoon member determines whether the to-be-sent data has been received. If the to-be-sent data is not received, the second platoon member processes the to-be-sent data, or if the to-be-sent data is received, the second platoon member discards the to-be-sent data.

The to-be-sent data includes a data identifier. Therefore, when receiving to-be-sent data sent by a specific target communications node, the second platoon member determines, based on the data identifier included in the to-be-sent data, whether the to-be-sent data has been received.

Figure 7D:
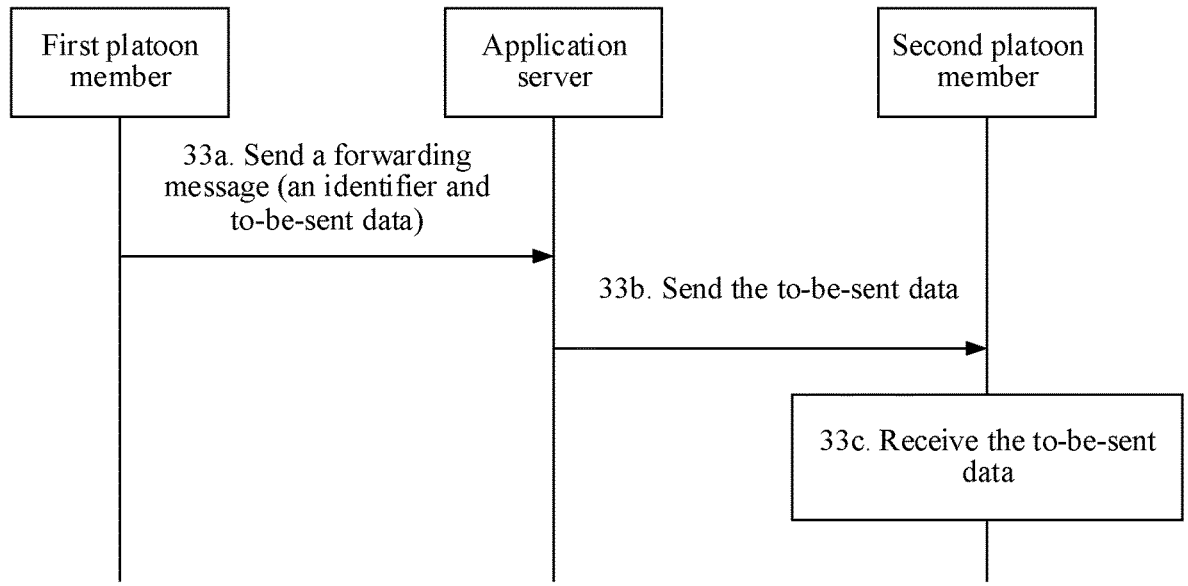
FIG. 7D is a flowchart of another communications method according to an embodiment of this application.

When the target communications node is the application server in the Internet of vehicles, the first platoon member sends a forwarding message to the application server. The forwarding message includes the to-be-sent data and identification information used to identify the at least one second platoon member. Then the application server sends the to-be-sent data to each second platoon member. Referring to FIG. 7D, the following steps 33a to 33c may be included in an implementation.

33a. The first platoon member sends the forwarding message to the application server, where the forwarding message includes the to-be-sent data and the identification information used to identify the at least one second platoon member.

When other platoon members in the platoon that are different from the first platoon member are all second platoon members, the identification information is a group identifier of the platoon, or when not all other platoon members in the platoon that are different from the first platoon member are second platoon members, the identification information is the device identifier of each second platoon member.

33b. The application server receives the forwarding message, and sends the to-be-sent data to each second platoon member based on the identification information included in the forwarding message.

Further, the application server receives the forwarding message. The forwarding message includes the to-be-sent data and the identification information. If the identification information is the group identifier of the platoon, a corresponding first member list is obtained based on the group identifier, and the to-be-sent data is broadcast to each platoon member based on a device identifier of each platoon member included in the first member list. If the identification information is the device identifier of each second platoon member, the to-be-sent data is sent to each second platoon member based on the device identifier of each second platoon member.

If the identification information is the group identifier of the platoon, it indicates that the second platoon member is another platoon member in the platoon that is different from the first platoon member, and the application server may broadcast the to-be-sent data to each platoon member in the first member list, or broadcast the to-be-sent data to any other platoon member in the first member list that is different from the first platoon member.

33c. The second platoon member receives the to-be-sent data sent by the application server.

In this embodiment of this application, the first platoon member determines the at least one second platoon member. The signal quality of the communication link from the first platoon member to each second platoon member is less than the first preset quality threshold. In other words, communication between the first platoon member and each second platoon member is blocked. The first platoon member determines the target communications node. The signal quality of the communication link from the target communications node to each second platoon member is greater than or equal to the first preset quality threshold such that data sent by the target communications node to each second platoon member can be successfully received by each second platoon member. Therefore, the first platoon member can successfully send the to-be-sent data to each second platoon member through the target communications node. This avoids a traffic accident.

It should be noted that the communications method described in the foregoing embodiment may be performed by a platoon member, or may be performed by a vehicle-mounted terminal or a vehicle-mounted apparatus on the platoon member, or may be performed by an Internet of vehicles application installed on the platoon member. This is not limited in this application.

The foregoing mainly describes the solutions provided in the embodiments of the present disclosure from the perspective of a system architecture and a method procedure. A person of ordinary skill in the art should be easily aware that the method steps described with reference to the embodiments disclosed in this specification may be implemented by hardware or a combination of hardware and computer software in the present disclosure. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

Figure 8:
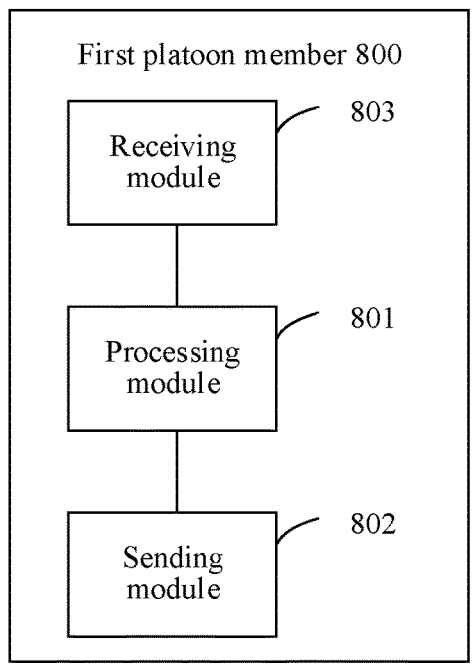
FIG. 8 is a schematic structural diagram of a communications apparatus according to an embodiment of this application.

Referring to FIG. 8, an embodiment of this application provides a communications apparatus 800. The apparatus 800 may be configured to implement a function of the first platoon member in any one of the embodiments shown in FIG. 1A to FIG. 1D, FIG. 2 to FIG. 6, and FIG. 7A to FIG. 7D. The apparatus 800 may be the first platoon member, or may be a vehicle-mounted apparatus on the first platoon member. The apparatus 800 (or the first platoon member in which the apparatus 800 is located) and at least one second platoon member belong to a same platoon. The apparatus 800 includes a processing module 801 configured to determine at least one second platoon member, where signal quality of a communication link from the apparatus 800 to each second platoon member is less than a first preset quality threshold, and determine a target communications node, where signal quality of a communication link from the target communications node to each second platoon member is greater than or equal to the first preset quality threshold, and a sending module 802 configured to send to-be-sent data to each second platoon member through the target communications node.

Optionally, the processing module 801 is configured to determine a device identifier of the apparatus 800 as a sending device identifier, and obtain at least one corresponding receiving device identifier from a first communication quality table based on the sending device identifier, where signal quality of a communication link from a platoon member corresponding to a sending device identifier stored in each record in the first communication quality table to a platoon member corresponding to a receiving device identifier stored in the record is less than the first preset quality threshold, and determine a platoon member corresponding to each of the at least one receiving device identifier as the second platoon member.

Optionally, the processing module 801 is configured to determine a device identifier of the apparatus 800 as a sending device identifier, and obtain at least one corresponding receiving device identifier from a second communication quality table based on the sending device identifier, where signal quality of a communication link from a platoon member corresponding to a sending device identifier stored in each record in the second communication quality table to a platoon member corresponding to a receiving device identifier stored in the record is greater than or equal to the first preset quality threshold, and remove the device identifier of the apparatus 800 and the at least one receiving device identifier from a first member list to obtain a second member list, where a platoon member corresponding to each device identifier in the second member list is the second platoon member, and the first member list includes a device identifier of each platoon member in the platoon.

Optionally, the processing module 801 is configured to use a device identifier of each second platoon member as a receiving device identifier, and obtain at least one corresponding sending device identifier from the first communication quality table based on the receiving device identifier, where the signal quality of the communication link from the platoon member corresponding to the sending device identifier stored in each record in the first communication quality table to the platoon member corresponding to the receiving device identifier stored in the record is less than the first preset quality threshold, remove the at least one sending device identifier and the device identifier of each second platoon member from the first member list to obtain a third member list, where the first member list includes the device identifier of each platoon member in the platoon, and select one or more of platoon members corresponding to device identifiers in the third member list as one or more target communications nodes.

Optionally, the processing module 801 is configured to use the device identifier of the apparatus 800 as the sending device identifier, and obtain the at least one corresponding receiving device identifier from the second communication quality table based on the sending device identifier, where the signal quality of the communication link from the platoon member corresponding to the sending device identifier stored in each record in the second communication quality table to the platoon member corresponding to the receiving device identifier stored in the record is greater than or equal to the first preset quality threshold, use a device identifier of each second platoon member as a receiving device identifier, and obtain at least one corresponding sending device identifier from the second communication quality table based on the receiving device identifier, calculate an intersection set of a receiving member list and a sending member list to obtain a third member list, where the receiving member list includes the at least one receiving device identifier, and the sending member list includes the at least one sending device identifier, and select one of platoon members corresponding to device identifiers in the third member list as the target communications node.

Optionally, the processing module 801 is further configured to remove, from the third list, a device identifier of a platoon member whose load exceeds a first preset load threshold from the third member list and/or a device identifier of a platoon member at the head of the platoon.

Optionally, the processing module 801 is further configured to, when the third member list is empty, determine an application server in the Internet of vehicles as the target communications node.

Optionally, the sending module 802 is configured to, when the target communications node is a platoon member in the platoon, broadcast a first Internet of vehicles message to all platoon members included in the platoon, where the first Internet of vehicles message includes the to-be-sent data and a device identifier of the target communications node, and the first Internet of vehicles message is used by the target communications node to broadcast a second Internet of vehicles message including the to-be-sent data to other platoon members included in the platoon, or when the target communications node is a platoon member in the platoon, broadcast a first Internet of vehicles message to all platoon members included in the platoon, where the first Internet of vehicles message includes the to-be-sent data, a device identifier of the target communications node, and the device identifier of each second platoon member, and the first Internet of vehicles message is used by the target communications node to send the to-be-sent data to each second platoon member based on the device identifier of each second platoon member.

Optionally, the sending module 802 is configured to, when the target communications node is the application server in the Internet of vehicles, send a forwarding message to the application server, where the forwarding message includes the to-be-sent data and identification information used to identify the at least one second platoon member, and the identification information is used by the application server to send the to-be-sent data to each second platoon member.

Optionally, when other platoon members in the platoon that are different from the apparatus 800 are all second platoon members, the identification information is a group identifier of the platoon.

Alternatively, when not all other platoon members in the platoon that are different from the apparatus 800 are second platoon members, the identification information is the device identifier of each second platoon member.

Optionally, the processing module 801 is further configured to detect that signal quality of a communication link from a third platoon member to a fourth platoon member is less than the first preset quality threshold, use a device identifier of the third platoon member as a sending device identifier and use a device identifier of the fourth platoon member as a receiving device identifier, and correspondingly store the sending device identifier and the receiving device identifier in the first communication quality table, where the third platoon member and the fourth platoon member are two platoon members in the platoon.

Optionally, the apparatus 800 further includes a receiving module 803.

The receiving module 803 is configured to receive a reference signal sent by the third platoon member, and when signal quality of the reference signal is less than the first preset quality threshold, use the apparatus 800 as the fourth platoon member, and detect that the signal quality of the communication link from the third platoon member to the fourth platoon member is less than the first preset quality threshold.

Alternatively, the receiving module 803 is configured to receive a third Internet of vehicles message that is broadcast by the fourth platoon member when it is detected that the signal quality of the communication link from the third platoon member to the fourth platoon member is less than the first preset quality threshold. The third Internet of vehicles message includes the device identifier of the third platoon member and the device identifier of the fourth platoon member.

Optionally, the processing module 801 is further configured to, when it is detected that the signal quality of the communication link from the third platoon member to the fourth platoon member is greater than or equal to a second preset quality threshold, use the device identifier of the third platoon member as the sending device identifier and use the device identifier of the fourth platoon member as the receiving device identifier, and delete a record including the sending device identifier and the receiving device identifier from the first communication quality table. The second preset quality threshold is greater than or equal to the first preset quality threshold.

Optionally, the receiving module 803 is configured to receive a reference signal sent by the third platoon member, and when signal quality of the reference signal is greater than or equal to the second preset quality threshold, use the apparatus 800 as the fourth platoon member, and detect that the signal quality of the communication link from the third platoon member to the fourth platoon member is greater than or equal to the second preset quality threshold.

Alternatively, the receiving module 803 is configured to receive a fourth Internet of vehicles message that is broadcast by the fourth platoon member when it is detected that the signal quality of the communication link from the third platoon member to the fourth platoon member is greater than or equal to the second preset quality threshold. The fourth Internet of vehicles message includes the device identifier of the third platoon member and the device identifier of the fourth platoon member.

Optionally, the processing module 801 is further configured to, when the first communication quality table changes, remove records in the first communication quality table from a global communication quality table to obtain the second communication quality table, where a sending device identifier stored in each record in the global communication quality table corresponds to a platoon member in the platoon, and a receiving device identifier stored in the record corresponds to another platoon member in the platoon.

Optionally, the processing module 801 is further configured to, when it is detected that the signal quality of the communication link from the third platoon member to the fourth platoon member is greater than or equal to the second preset quality threshold, use the device identifier of the third platoon member as the sending device identifier and use the device identifier of the fourth platoon member as the receiving device identifier, and correspondingly store the sending device identifier and the receiving device identifier in the second communication quality table, where the third platoon member and the fourth platoon member are two platoon members in the platoon, and the second preset quality threshold is greater than or equal to the first preset quality threshold.

Optionally, the receiving module 803 is configured to receive a reference signal sent by the third platoon member, and when signal quality of the reference signal is greater than or equal to the second preset quality threshold, use the apparatus 800 as the fourth platoon member, and detect that the signal quality of the communication link from the third platoon member to the fourth platoon member is greater than or equal to the second preset quality threshold.

Alternatively, the receiving module 803 is configured to receive a third Internet of vehicles message that is broadcast by the fourth platoon member when it is detected that the signal quality of the communication link from the third platoon member to the fourth platoon member is greater than or equal to the second preset quality threshold. The third Internet of vehicles message includes the device identifier of the third platoon member and the device identifier of the fourth platoon member.

Optionally, the processing module 801 is further configured to, when it is detected that the signal quality of the communication link from the third platoon member to the fourth platoon member is less than the first preset quality threshold, use the device identifier of the third platoon member as the sending device identifier and use the device identifier of the fourth platoon member as the receiving device identifier, and delete a record including the sending device identifier and the receiving device identifier from the second communication quality table.

Optionally, the receiving module 803 is configured to receive a reference signal sent by the third platoon member, and when signal quality of the reference signal is less than the first preset quality threshold, use the apparatus 800 as the fourth platoon member, and detect that the signal quality of the communication link from the third platoon member to the fourth platoon member is less than the first preset quality threshold.

Alternatively, the receiving module 803 is configured to receive a fourth Internet of vehicles message that is broadcast by the fourth platoon member when it is detected that the signal quality of the communication link from the third platoon member to the fourth platoon member is less than the first preset quality threshold. The fourth Internet of vehicles message includes the device identifier of the third platoon member and the device identifier of the fourth platoon member.

Optionally, the processing module 801 is further configured to, when it is detected that a load of a platoon member in the platoon exceeds the first preset load threshold, add a device identifier of the platoon member to an overload list.

Optionally, the processing module 801 is configured to, when it is detected that a load of the apparatus 800 exceeds the first preset load threshold, add the device identifier of the apparatus 800 to an overload list, and/or receive a fifth Internet of vehicles message that is broadcast by a fifth platoon member when a load of the fifth platoon member exceeds the first preset load threshold, where the fifth Internet of vehicles message includes a device identifier of the fifth platoon member, and the fifth platoon member is another platoon member in the platoon that is different from the apparatus 800, and add the device identifier of the fifth platoon member to the overload list.

Optionally, the processing module 801 is further configured to, when it is detected that a load of a platoon member is less than the second preset load threshold, remove a device identifier of the platoon member from the overload list, where the second preset load threshold is less than or equal to the first preset load threshold.

Optionally, the processing module 801 is configured to, when it is detected that a load of the apparatus 800 is less than the second preset load threshold, remove the device identifier of the apparatus 800 from the overload list, and/or receive a sixth Internet of vehicles message that is broadcast by a fifth platoon member when a load of the fifth platoon member is less than the second preset load threshold, where the sixth Internet of vehicles message includes a device identifier of the fifth platoon member, and the fifth platoon member is another platoon member in the platoon that is different from the apparatus 800, and remove the device identifier of the fifth platoon member from the overload list.

Optionally, the processing module 801 is further configured to, when the apparatus 800 joins the platoon, receive a first group message sent by a platoon member at the head of the platoon, where the first group message includes at least one of the first member list, the first communication quality table, the second communication quality table, the first preset quality threshold, the second preset quality threshold, the first preset load threshold, and the second preset load threshold.

The first member list includes the device identifier of each platoon member in the platoon. The signal quality of the communication link from the platoon member corresponding to the sending device identifier stored in each record in the first communication quality table to the platoon member corresponding to the receiving device identifier stored in the record is less than the first preset quality threshold. The signal quality of the communication link from the platoon member corresponding to the sending device identifier stored in each record in the second communication quality table to the platoon member corresponding to the receiving device identifier stored in the record is greater than or equal to the first preset quality threshold.

Optionally, the processing module 801 is further configured to, when a platoon member joins the platoon, add a device identifier of the joined platoon member to the first member list, and/or when a platoon member exits from the platoon, remove, from the first member list, a device identifier of the platoon member that exits, where the first member list includes the device identifier of each platoon member in the platoon member.

Optionally, the processing module 801 is further configured to, when the first member list changes, update a changed first member list to another platoon member in the platoon that is different from the apparatus 800, and/or update the changed first member list to the application server in the Internet of vehicles.

In this embodiment of this application, the first platoon member determines the at least one second platoon member. The signal quality of the communication link from the first platoon member to each second platoon member is less than the first preset quality threshold. The first platoon member determines the target communications node. The signal quality of the communication link from the target communications node to each second platoon member is greater than or equal to the first preset quality threshold such that data sent by the target communications node to each second platoon member can be successfully received by each second platoon member. Therefore, the first platoon member sends the to-be-sent data to each second platoon member through the target communications node such that each second platoon member can receive the to-be-sent data of the first platoon member. This avoids blocking of communication between the first platoon member and the second platoon member, and avoids a traffic accident.

Figure 9:
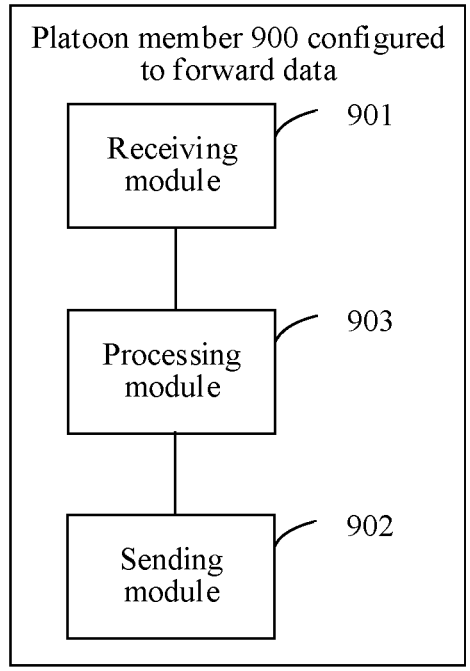
FIG. 9 is a schematic structural diagram of another communications apparatus according to an embodiment of this application.

Referring to FIG. 9, an embodiment of this application provides a communications apparatus 900. The apparatus 900 may be configured to implement a function of a platoon member configured to forward data in any one of the embodiments shown in FIG. 7A to FIG. 7D. The apparatus 900 may be the platoon member configured to forward data, or may be a vehicle-mounted apparatus on the platoon member configured to forward data. A first platoon member, each second platoon member, and the apparatus 900 (or the platoon member that is configured to forward data and in which the apparatus 900 is located) belong to a same platoon. The apparatus 900 includes a receiving module 901, a sending module 902, and a processing module 903.

The receiving module 901 is configured to receive a first Internet of vehicles message that is broadcast by the first platoon member. The first Internet of vehicles message includes to-be-sent data of the first platoon member and a device identifier of a target communications node. Signal quality of a communication link from the target communications node to each of at least one second platoon member is greater than or equal to a first preset quality threshold, and signal quality of a communication link from the first platoon member to each second platoon member is less than the first preset quality threshold.

The sending module 902 is configured to, when the processing module 903 determines that a device identifier of the apparatus 900 is the same as the device identifier of the target communications node, send the to-be-sent data to each second platoon member.

Optionally, the sending module 902 is configured to, when the first Internet of vehicles message further includes a device identifier of each second platoon member, send the to-be-sent data to each second platoon member based on the device identifier of each second platoon member.

Alternatively, the sending module 902 is configured to, when the first Internet of vehicles message does not include the device identifier of each second platoon member, broadcast the to-be-sent data to other platoon members in the platoon.

In this embodiment of this application, the apparatus receives the first Internet of vehicles message that is broadcast by the first platoon member. When the device identifier of the apparatus 900 is the same as the device identifier of the target communications node in the first Internet of vehicles message, the apparatus 900 sends the to-be-sent data of the first platoon member to each second platoon member. Therefore, each second platoon member can receive the to-be-sent data of the first platoon member. This avoids blocking of communication between the first platoon member and the second platoon member.

Figure 10:
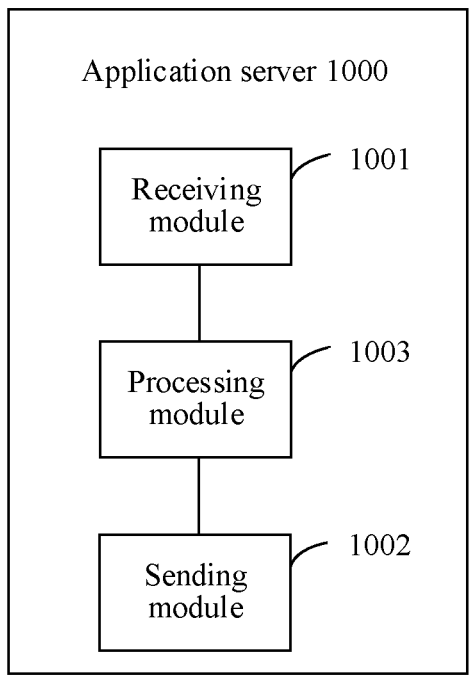
FIG. 10 is a schematic structural diagram of another communications apparatus according to an embodiment of this application.

Referring to FIG. 10, an embodiment of this application provides a communications apparatus 1000. The apparatus 1000 may be the application server or a part of the application server in any one of the embodiments shown in FIG. 1B to FIG. 1D and FIG. 7A to FIG. 7D. The apparatus 1000 includes a receiving module 1001 configured to receive a forwarding message sent by a first platoon member, where the forwarding message includes to-be-sent data and identification information used to identify at least one second platoon member, signal quality of a communication link from the first platoon member to each of the at least one second platoon member is less than a first preset quality threshold, and the first platoon member and each second platoon member belong to a same platoon, and a sending module 1002 configured to send to-be-sent data to each second platoon member based on the identification information.

Optionally, the receiving module 1001 is further configured to receive a second group message that is sent by a platoon member at the head of the platoon when the platoon is established. The second group message includes a group identifier of the platoon and a first member list, and the first member list includes a device identifier of each platoon member in the platoon.

Optionally, the apparatus 1000 further includes a processing module 1003.

The sending module 1002 is configured to, when the processing module 1003 determines that the identification information is the group identifier of the platoon, send the to-be-sent data to each second platoon member based on the first member list corresponding to the group identifier.

Alternatively, the sending module 1002 is configured to, when the processing module 1003 determines that the identification information is the device identifier of each second platoon member, send the to-be-sent data to each second platoon member based on the device identifier of each second platoon member.

In this embodiment of this application, the forwarding message sent by the first platoon member is received, and the to-be-sent data of the first platoon member is sent to each second platoon member based on the identification information included in the forwarding message. Therefore, each second platoon member can receive the to-be-sent data of the first platoon member. This avoids blocking of communication between the first platoon member and the second platoon member.

The function modules shown in FIG. 8, FIG. 9, and FIG. 10 may be implemented in a form of hardware, or may be implemented in a form of a software function module. It should be noted that, in this embodiment of the present disclosure, module division is an example, and is merely logical function division. In an embodiment, another division manner may be used.

Figure 11:
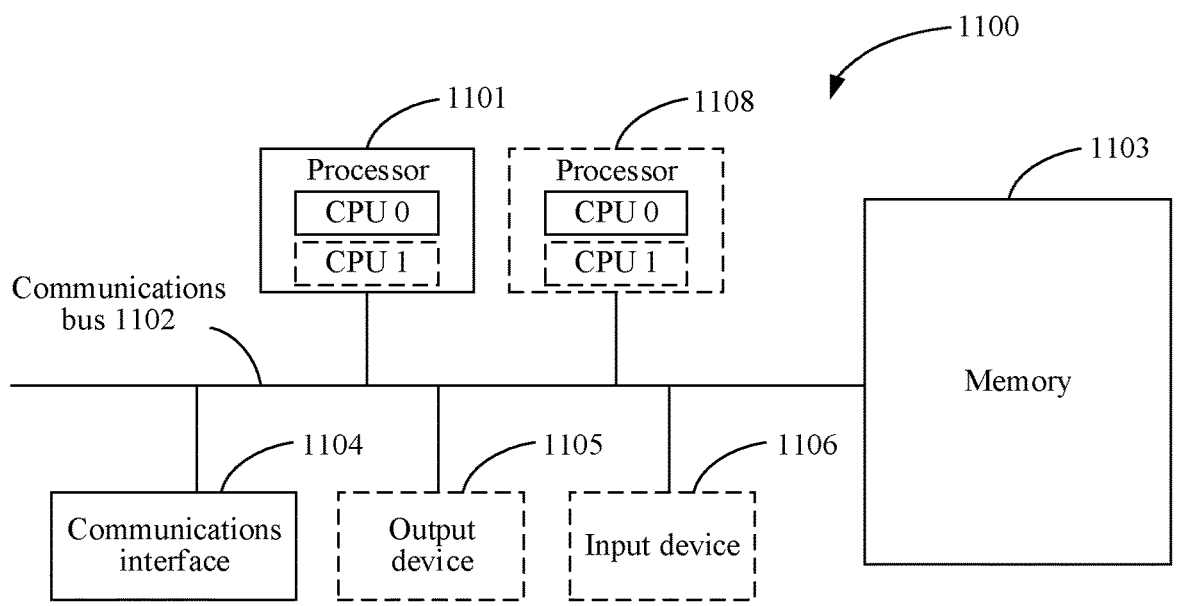
FIG. 11 is a schematic structural diagram of another communications apparatus according to an embodiment of this application.

FIG. 11 is a schematic diagram of a communications apparatus 1100 according to an embodiment of this application. The communications apparatus 1100 includes at least one processor 1101, a communications bus 1102, a memory 1103, and at least one communications interface 1104.

The apparatus 1100 is an apparatus of a hardware structure, and may be configured to implement the function modules in the communications apparatus in FIG. 8 or FIG. 9. For example, a person skilled in the art may figure out that the processing module 801 in the communications apparatus 800 shown in FIG. 8 and/or the processing module 903 in the communications apparatus 900 shown in FIG. 9 may be implemented by the at least one processor 1101 by invoking code in the memory 1103, and the sending module 802 and the receiving module 803 in the communications apparatus 800 shown in FIG. 8 and/or the receiving module 901 and the sending module 902 in the communications apparatus 900 shown in FIG. 9 may be implemented through the at least one communications interface 1104.

The communications apparatus 1100 may be further configured to implement a function of a platoon member in any one of the embodiments shown in FIG. 1A to FIG. 1D, FIG. 2 to FIG. 6, and FIG. 7A to FIG. 7D. The platoon member may be the first platoon member or a platoon member configured to forward data. The apparatus 1100 may be the platoon member, or may be a vehicle-mounted apparatus on the platoon member.

Optionally, the processor 1101 may be a general-purpose central processing unit (CPU), a microprocessor, an application-specific integrated circuit (ASIC), or one or more integrated circuits configured to control program execution of the solutions in this application.

The communications bus 1102 may include a pathway in which information is transmitted between the foregoing components.

The communications interface 1104, which uses any apparatus such as a transceiver, is configured to communicate with another device or a communications network, such as the Ethernet, a radio access network (RAN), or a wireless local area network (WLAN).

The memory 1103 may be a read-only memory (ROM) or another type of static storage device capable of storing static information and instructions, a random access memory (RAM) or another type of dynamic storage device capable of storing information and instructions, an electrically erasable programmable read-only memory (EEPROM), a compact disc read-only memory (CD-ROM) or another compact disc storage, an optical disc storage (including a compressed optical disc, a laser disc, an optical disc, a digital versatile disk, a BLURAY optical disc, and the like), a magnetic disk storage medium or another magnetic storage device, or any other medium capable of carrying or storing expected program code in a form of an instruction or a data structure and capable of being accessed by a computer, but the memory 1103 is not limited thereto. The memory may exist independently, and is connected to the processor through the bus. The memory may be integrated with the processor.

The memory 1103 is configured to store application program code used for executing the solutions in this application, and the processor 1101 controls the execution. The processor 1101 is configured to execute the application program code stored in the memory 1103, to implement functions in the methods in the patent.

In an embodiment, the processor 1101 may include one or more CPUs, such as a CPU 0 and a CPU 1 in FIG. 11.

In an embodiment, the communications apparatus 1100 may include a plurality of processors, for example, the processor 1101 and a processor 1108 in FIG. 11. Each of these processors may be a single-core (single-core CPU) processor, or may be a multi-core (multi-CPU) processor. The processor herein may be one or more devices, circuits, and/or processing cores configured to process data (for example, a computer program instruction).

In an embodiment, the communications apparatus 1100 may further include an output device 1105 and an input device 1106. The output device 1105 communicates with the processor 1101, and may display information in various manners. For example, the output device 1105 may be a liquid crystal display (LCD), a light emitting diode (LED) display device, a cathode ray tube (CRT) display device, or a projector. The input device 1106 communicates with the processor 1101, and may receive input of a user in various manners. For example, the input device 1106 may be a mouse, a keyboard, a touchscreen device, or a sensor device.

Figure 12:
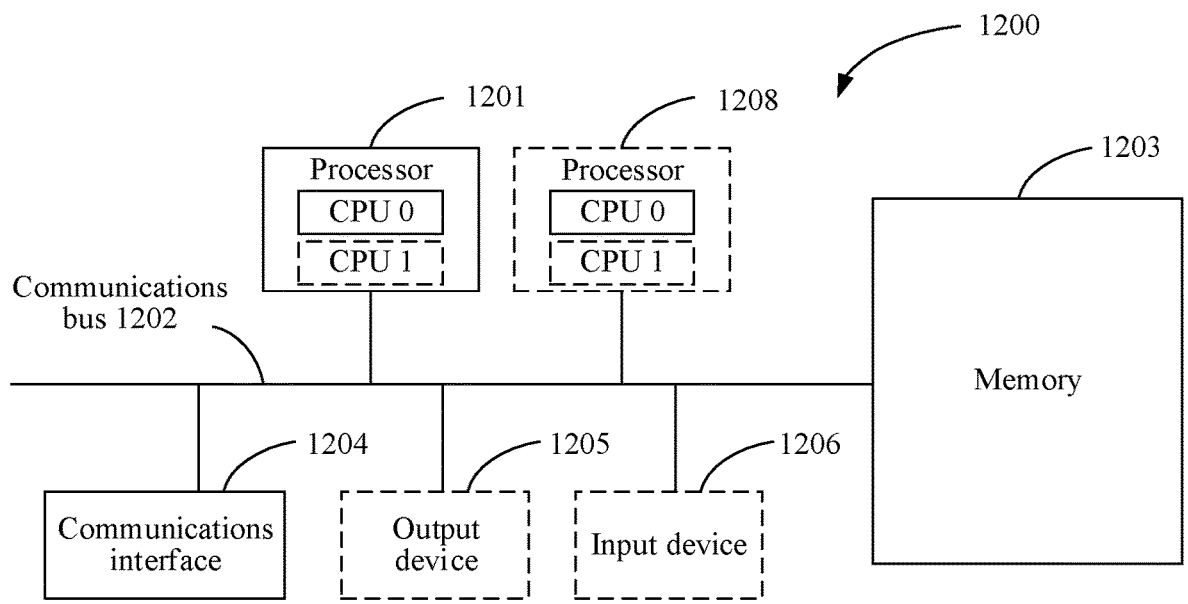
FIG. 12 is a schematic structural diagram of another communications apparatus according to an embodiment of this application.

FIG. 12 is a schematic diagram of a communications apparatus 1200 according to an embodiment of this application. The communications apparatus 1200 includes at least one processor 1201, a communications bus 1202, a memory 1203, and at least one communications interface 1204.

The apparatus 1200 is an apparatus of a hardware structure, and may be configured to implement the function modules in the communications apparatus in FIG. 10. For example, a person skilled in the art may figure out that the processing module 1003 in the communications apparatus 1000 shown in FIG. 10 may be implemented by the at least one processor 1201 by invoking code in the memory 1203, and the receiving module 1001 and the sending module 1002 in the communications apparatus 1000 shown in FIG. 10 may be implemented through the at least one communications interface 1204.

The communications apparatus 1200 may be further configured to implement the application or a part of the application server in any one of the embodiments shown in FIG. 1B to FIG. 1D and FIG. 7A to FIG. 7D.

Optionally, the processor 1201 may be a general-purpose CPU, a microprocessor, an ASIC, or one or more integrated circuits configured to control program execution of the solutions in this application.

The communications bus 1202 may include a pathway in which information is transmitted between the foregoing components.

The communications interface 1204, which uses any apparatus such as a transceiver, is configured to communicate with another device or a communications network, such as the Ethernet, a RAN, or a WLAN.

The memory 1203 may be a ROM or another type of static storage device capable of storing static information and instructions, a RAM or another type of dynamic storage device capable of storing information and instructions, an EEPROM, a CD-ROM or another compact disc storage, an optical disc storage (including a compressed optical disc, a laser disc, an optical disc, a digital versatile disk, a BLURAY optical disc, and the like), a magnetic disk storage medium or another magnetic storage device, or any other medium capable of carrying or storing expected program code in a form of an instruction or a data structure and capable of being accessed by a computer, but the memory 1203 is not limited thereto. The memory may exist independently, and is connected to the processor through the bus. The memory may be integrated with the processor.

The memory 1203 is configured to store application program code for executing the solutions in this application, and the processor 1201 controls the execution. The processor 1201 is configured to execute the application program code stored in the memory 1203, to implement functions in the methods in the patent.

In an embodiment, the processor 1201 may include one or more CPUs, such as a CPU 0 and a CPU 1 in FIG. 12.

In an embodiment, the communications apparatus 1200 may include a plurality of processors, for example, the processor 1201 and a processor 1208 in FIG. 12. Each of these processors may be a single-core (single-CPU) processor, or may be a multi-core (multi-CPU) processor. The processor herein may be one or more devices, circuits, and/or processing cores configured to process data (for example, a computer program instruction).

In an embodiment, the communications apparatus 1200 may further include an output device 1205 and an input device 1206. The output device 1205 communicates with the processor 1201, and may display information in a plurality of manners. For example, the output device 1205 may be a LCD, an LED display device, or a CRT display device. The input device 1206 communicates with the processor 1201, and may receive input of a user in a plurality of manners. For example, the input device 1206 may be a mouse, a keyboard, or a touchscreen device.

Referring to FIG. 1B, an embodiment of this application provides a communications system. The system includes the communications apparatus 1 in FIG. 8, FIG. 9, or FIG. 11, and the communications apparatus 2 in FIG. 10 or FIG. 12. The communications apparatus 1 may be a platoon member, and the communications apparatus 2 may be an application server.

Sequence numbers of the foregoing embodiments of this application are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer readable storage medium. The storage medium may include a read-only memory, a magnetic disk, or a compact disc.

The foregoing descriptions are merely optional embodiments of this application, but are not intended to limit this application. Any modification, equivalent replacement, or improvement made without departing from the principle of this application should fall within the protection scope of this application.

What is claimed is:

1. A communications method, implemented by a first platoon member, wherein the communications method comprises:
    determining a second platoon member, wherein the first platoon member and the second platoon member belong to a same platoon, and wherein a signal quality of a communication link from the first platoon member to the second platoon member is less than a first preset quality threshold;
    determining a target communications node, wherein a signal quality of a communication link from the target communications node to the second platoon member is greater than or equal to the first preset quality threshold;
    sending to-be-sent data to the second platoon member through the target communications node;
    obtaining a receiving device identifier corresponding to a third platoon member from a first communication quality table based on a device identifier of the first platoon member, wherein a signal quality of a communication link from the first platoon member to the third platoon member is less than the first preset quality threshold; and
    determining third platoon member as the second platoon member.

2. The communications method of claim 1, further comprising:
    obtaining a receiving device identifier corresponding to at least one platoon member from a second communication quality table based on a device identifier of the first platoon member, wherein a signal quality of a communication link from the first platoon member to the at least one platoon member is greater than or equal to the first preset quality threshold; and
    removing the device identifier of the first platoon member and the receiving device identifier from a first member list to obtain a second member list, wherein the first member list comprises a plurality of device identifiers of each of a plurality of platoon members in the platoon, and wherein a third platoon member corresponding to each of the plurality of device identifiers in the second member list is the second platoon member.

3. The communications method of claim 1, further comprising:
    using a device identifier of the second platoon member as a receiving device identifier;
    obtaining at least one sending device identifier corresponding to a third platoon member from each record of a first communication quality table based on the receiving device identifier, wherein the signal quality of the communication link from the third platoon member to the second platoon member is less than the first preset quality threshold;
    removing the at least one sending device identifier and the device identifier of the second platoon member from a first member list to obtain a third member list, wherein the first member list comprises a plurality of device identifiers of each of a plurality of platoon members in the platoon; and
    selecting one or more of the platoon members that correspond to the device identifiers in the third member list as the target communications node.

4. The communications method of claim 1, further comprising:
    using a device identifier of the first platoon member as a sending device identifier;
    obtaining at least one receiving device identifier corresponding to a third platoon member from each record of a second communication quality table based on the sending device identifier, wherein the signal quality of the communication link from the first platoon member to the third platoon member is greater than or equal to the first preset quality threshold;
    using a device identifier of the second platoon member as a receiving device identifier;
    obtaining at least one sending device identifier from the second communication quality table based on the receiving device identifier;
    calculating an intersection set of a receiving member list and a sending member list to obtain a third member list, wherein the receiving member list comprises the receiving device identifier, and wherein the sending member list comprises the at least one sending device identifier; and selecting one or more of a plurality of platoon members that correspond to a plurality of device identifiers in the third member list as the target communications node.

5. The communications method of claim 1, further comprising broadcasting a first Internet of vehicles (IoV) message to all platoon members comprised in the platoon, wherein the target communications node is one of the platoon members, wherein the first IoV message comprises the to-be-sent data and a device identifier of the target communications node.

6. The communications method of claim 1, further comprising broadcasting a first Internet of vehicles (IoV) message to all platoon members comprised in the platoon, wherein the target communications node is one of the platoon members, and wherein the first IoV message comprises the to-be-sent data, a device identifier of the target communications node, and a device identifier of each second platoon member.

7. The communications method of the claim 1, when the target communications node is an application server of an Internet of vehicles (IoV), wherein the communications method further comprises sending a forwarding message to the application server, wherein the forwarding message comprises the to-be-sent data and identification information identifying the second platoon member.

8. A communications apparatus, comprising:
a processor; and
a memory coupled to the processor and storing instructions that, when executed by the processor, cause the communications apparatus to be configured to:
determine a second platoon member, wherein a first platoon member and the second platoon member belong to a same platoon, and wherein signal quality of a communication link from the first platoon member to the second platoon member is less than a first preset quality threshold;
determine a target communications node, wherein signal quality of a communication link from the target communications node to the second platoon member is greater than or equal to the first preset quality threshold; and
send to-be-sent data to the second platoon member through the target communications node;
obtaining a receiving device identifier corresponding to a third platoon member from a first communication quality table based on a device identifier of the first platoon member, wherein signal quality of a communication link from the first platoon member to the third platoon member is less than the first preset quality threshold, and
determining third platoon member as the second platoon member.

9. The communications apparatus of claim 8, wherein the instructions further cause the processor to be configured to:
obtain a receiving device identifier corresponding to at least one platoon member from a second communication quality table based on a device identifier of the first platoon member, wherein signal quality of a communication link from the first platoon member to the at least one platoon member is greater than or equal to the first preset quality threshold; and
remove the device identifier of the first platoon member and the receiving device identifier from a first member list to obtain a second member list, wherein the first member list comprises a plurality of device identifiers of each of a plurality of platoon members in the platoon, and wherein a third platoon member corresponding to each of the plurality of device identifiers in the second member list is the second platoon member.

10. The communications apparatus of claim 8, wherein the instructions further cause the processor to be configured to:
use a device identifier of the second platoon member as a receiving device identifier;
obtain at least one sending device identifier corresponding to a third platoon member from each record of a first communication quality table based on the receiving device identifier, wherein the signal quality of the communication link from the third platoon member to the second platoon member is less than the first preset quality threshold;
remove the at least one sending device identifier and the device identifier of the second platoon member from a first member list to obtain a third member list, wherein the first member list comprises a plurality of device identifiers of each of a plurality of platoon members in the platoon; and
select one or more of the platoon members that correspond to the device identifiers in the third member list as the target communications node.

11. The communications apparatus of claim 8, wherein the instructions further cause the processor to be configured to:
use a device identifier of the first platoon member as a sending device identifier;
obtain at least one receiving device identifier corresponding to a third platoon member from each record of a second communication quality table based on the sending device identifier, wherein the signal quality of the communication link from the first platoon member to the third platoon member is greater than or equal to the first preset quality threshold;
use a device identifier of the second platoon member as a receiving device identifier;
obtain at least one sending device identifier from the second communication quality table based on the receiving device identifier;
calculate an intersection set of a receiving member list and a sending member list to obtain a third member list, wherein the receiving member list comprises the receiving device identifier, and wherein the sending member list comprises the at least one sending device identifier; and
select one or more of a plurality of platoon members that correspond to a plurality of device identifiers in the third member list as the target communications node.

12. The communications apparatus of claim 8, wherein the instructions further cause the processor to be configured to broadcast a first Internet of vehicles (IoV) message to all platoon members comprised in the platoon, wherein the first IoV message comprises the to-be-sent data and a device identifier of the target communications node.

13. The communications apparatus of claim 8, wherein the instructions further cause the processor to be configured to broadcast a first Internet of vehicles (IoV) message to all platoon members comprised in the platoon, and wherein the first IoV message comprises the to-be-sent data, a device identifier of the target communications node, and a device identifier of each second platoon member.

14. The communications apparatus of claim 8, when the target communications node is an application server of an Internet of vehicles (IoV), wherein the instructions further cause the processor to be configured to send a forwarding message to the application server, and wherein the forwarding message comprises the to-be-sent data and identification information used to identify the second platoon member.

15. A computer program product comprising computer-executable instructions for storage on a non-transitory computer-readable medium that, when executed by a processor, cause a control node to:
- determine a second platoon member, wherein a first platoon member and the second platoon member belong to a same platoon, and wherein signal quality of a communication link from the first platoon member to the second platoon member is less than a first preset quality threshold;
- determine a target communications node, wherein signal quality of a communication link from the target communications node to the second platoon member is greater than or equal to the first preset quality threshold; aid send to-be-sent data to the second platoon member through the target communications node;
- obtaining a receiving device identifier corresponding to a third platoon member from a first communication quality table based on a device identifier of the first platoon member, wherein signal quality of a communication link from the first platoon member to the third platoon member is less than the first preset quality threshold; and
- determining third platoon member as the second platoon member.

16. The computer program product of claim 15, wherein the instructions further cause the control node to:
- obtain a receiving device identifier corresponding to at least one platoon member from a second communication quality table based on a device identifier of the first platoon member, wherein signal quality of a communication link from the first platoon member to the at least one platoon member is greater than or equal to the first preset quality threshold; and
- remove the device identifier of the first platoon member and the receiving device identifier from a first member list to obtain a second member list, wherein the first member list comprises a plurality of device identifiers of each of a plurality of platoon members in the platoon, wherein a third platoon member corresponding to each of the plurality of device identifiers in the second member list is the second platoon member.

17. The computer program product of claim 15, wherein the instructions further cause the control node to:
- use a device identifier of the second platoon member as a receiving device identifier;
- obtain at least one sending device identifier corresponding to a third platoon member from each record of a first communication quality table based on the receiving device identifier, wherein the signal quality of the communication link from the third platoon member to the second platoon member is less than the first preset quality threshold;
- remove the at least one sending device identifier and the device identifier of the second platoon member from a first member list to obtain a third member list, wherein the first member list comprises a plurality of device identifiers of each of a plurality of platoon members in the platoon; and
- select one or more of the platoon members that correspond to the device identifiers in the third member list as the target communications node.

* * * * *

UNITED STATES PATENT AND TRADEMARK OFFICE
CERTIFICATE OF CORRECTION

PATENT NO. : 11,580,863 B2
APPLICATION NO. : 16/913578
DATED : February 14, 2023
INVENTOR(S) : Can Zhao It is certified that error appears in the above-identified patent and that said Letters Patent is hereby corrected as shown below:

In the Claims

Claim 15, Column 47, Line 17: "aid send" should read "send"

Claim 15, Column 47, Line 19: "obtaining a receiving" should read "obtain a receiving"

Claim 15, Column 47, Line 26: "determining third" should read "determine third"

Signed and Sealed this
Eleventh Day of April, 2023

Katherine Kelly Vidal
*Director of the United States Patent and Trademark Office*